US012207342B2

(12) United States Patent
Akdim et al.

(10) Patent No.: US 12,207,342 B2
(45) Date of Patent: Jan. 21, 2025

(54) PERSONALIZED PRIVATE CELLULAR WIRELESS NETWORK MANAGEMENT FOR WIRELESS DEVICES

(71) Applicant: Apple Inc., Cupertino, CA (US)

(72) Inventors: Nabil Akdim, Bavaria-Bayern (DE); Gencer Cili, Santa Clara, CA (US); Mahak Goindani, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 17/805,442

(22) Filed: Jun. 3, 2022

(65) Prior Publication Data

US 2023/0396977 A1 Dec. 7, 2023

(51) Int. Cl.
*H04W 8/02* (2009.01)
*H04W 8/18* (2009.01)
*H04W 48/16* (2009.01)
*H04W 64/00* (2009.01)
*H04W 36/30* (2009.01)
*H04W 36/32* (2009.01)
*H04W 88/06* (2009.01)

(52) U.S. Cl.
CPC .............. *H04W 8/02* (2013.01); *H04W 8/183* (2013.01); *H04W 48/16* (2013.01); *H04W 64/00* (2013.01); *H04W 36/30* (2013.01); *H04W 36/32* (2013.01); *H04W 88/06* (2013.01)

(58) Field of Classification Search
CPC ....... H04W 8/02; H04W 8/183; H04W 48/16; H04W 64/00; H04W 36/30; H04W 36/32; H04W 88/06; H04W 36/302; H04W 48/18
See application file for complete search history.

(56) References Cited

U.S. PATENT DOCUMENTS

| 2022/0256310 | A1* | 8/2022 | Volkerink | H04W 4/024 |
| 2022/0295276 | A1* | 9/2022 | Yang | H04L 9/3271 |
| 2023/0090766 | A1* | 3/2023 | Clevorn | H04W 36/06 370/331 |
| 2023/0171586 | A1* | 6/2023 | Holmes | H04W 4/02 455/435.1 |

* cited by examiner

*Primary Examiner* — Dhaval V Patel
(74) *Attorney, Agent, or Firm* — DICKINSON WRIGHT RLLP

(57) ABSTRACT

The described embodiments set forth techniques for private cellular wireless network management personalized for a wireless device, including private cellular wireless network characterization at frequently visited locations, targeted cell search, cell radio link monitoring, and radio resource management. The wireless device builds a database of private cellular wireless networks characterized using information gathered when searching for and while attached to cells of a private cellular wireless network. The wireless device uses the database to determine when to enable or disable SIMs or eSIMs of private cellular wireless networks at known locations and network parameters to use to find and connect to the private cellular wireless networks. The wireless device uses learning processes to maintain currency of the database of private cellular wireless networks as network topologies change.

20 Claims, 19 Drawing Sheets

PERSONALIZED PRIVATE CELLULAR WIRELESS NETWORK MANAGEMENT FOR WIRELESS DEVICES

FIELD

The described embodiments set forth techniques for personalized private cellular wireless network management, including private cellular wireless network characterization of frequently visited locations, targeted cell search, cell radio link monitoring, and radio resource management.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Multi-SIM wireless devices allow for using multiple SIMs and/or eSIMs in the same wireless device, where each SIM/eSIM can be associated with a distinct cellular wireless subscription or service. Private cellular wireless networks are being deployed to provide secure high throughput, low latency, and massive connectivity wireless service to wireless devices that include a SIM and/or eSIM that permits access to a particular private cellular wireless network. Unlike public cellular wireless networks, private cellular wireless networks can span a limited geographic area, e.g., an office building, an office park, a manufacturing facility, a retail center, a residential dwelling, or the like. Searching for private cellular wireless networks when out of an associated geographic region and/or attempting to attach to private cellular wireless network to which the wireless device does not have permission to access can waste limited cellular wireless and power resources of the wireless device. There exists a need to manage use of cellular wireless resources by a private cellular wireless network SIM/eSIM.

SUMMARY

The described embodiments set forth techniques for private cellular wireless network management personalized for a wireless device, including private cellular wireless network characterization of frequently visited locations, targeted cell search, cell radio link monitoring, and radio resource management. A wireless device includes one or more subscriber identity modules (SIMs) and/or electronic SIMs (eSIMs) associated with one or more private cellular wireless networks. The wireless device maintains a set of geographic locations at which the wireless device is regularly used, such as home, work, school, gym, and the like. The frequent locations are determined based on geo-clustered location coordinate data correlated with time of day and duration spent at each frequent location. Private cellular wireless networks may be deployed at one or more frequent locations. The wireless device can perform a learning process to characterize private cellular networks found at the one or more frequent locations. During an initial private cellular wireless network learning process, the wireless device scans for cells, attempts to attach to cells, measures serving cells and neighbor cells, and takes note of attachment acceptances and attachment rejections as well as out of service (OOS) conditions for each cell. The wireless device builds a database of private cellular wireless networks that are found at one or more locations and characterizes the private cellular wireless networks using information gathered in the learning process. In some embodiments, the initial private cellular wireless network learning process is limited to frequent locations associated with use of the wireless device to conserve power and search resources of the wireless device. After the initial private cellular wireless network learning process, the wireless device can predict an early entrance to a frequent location, an early exit from a frequent location, and/or one or more expected next frequent locations to allow wireless circuitry of the wireless device to enable (activate) and disable (deactivate) SIMs/eSIMs that provide access to private cellular wireless networks at the frequent locations before entering and before leaving the frequent locations. The wireless device performs radio frequency scans and attempts to attach to wireless access networks at known frequent locations for enabled SIMs/eSIMs using parameters specific to one or more private cellular wireless networks available to the wireless device at the frequent location. While connected to private cellular wireless networks, the wireless device updates the database characterizing serving cell regions of the private cellular wireless networks based on a history of signal strength measurements correlated with location coordinates at which the measurements are taken. The database can include information for cells of private cellular wireless networks, such as global cell identifier (GCI) values for a serving cell and adjacent neighbor cells, signal strength values at handover (or reselection) between serving cells and adjacent neighbor cells, a center point location coordinate value at which a highest signal strength value was measured in a serving cell, and a notification radius value indicating a distance from the center point of the serving cell to an edge of the serving cell at which an out of service (OOS) condition occurs. On-device learning processes that initially characterize the cells for the database can subsequently be used to re-learn and update the database as private cellular wireless networks change, e.g., cells added/deleted, user-specific frequent location changes, user-triggered successful private cellular wireless network searches, and cell characterization data refinement. By enabling SIMs/eSIMs specific to private cellular wireless networks at learned frequent locations and otherwise keeping the private cellular wireless network SIMs/eSIMs disabled, the wireless device conserves limited battery resources to avoid searching for private cellular wireless networks unnecessarily and allows shared cellular baseband resources to be used by SIMs/eSIMs associated with public cellular wireless networks with less interruption.

Other aspects and advantages of the present disclosure will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
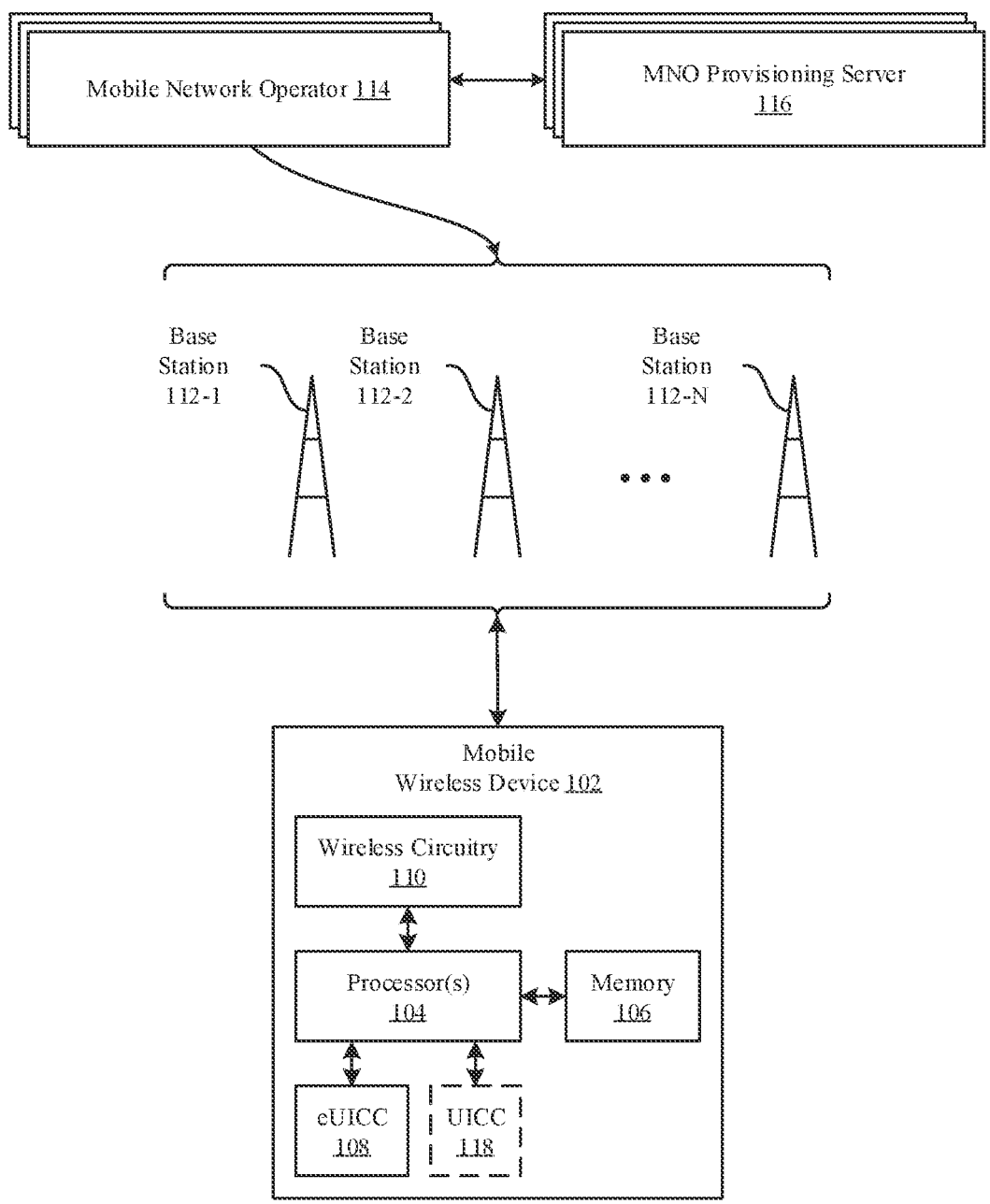
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for private cellular wireless network management personalized for a wireless device, including frequent location private network characterization, targeted cell search, cell radio link monitoring, and radio resource management. Private cellular wireless networks using fourth generation (4G) Long Term Evolution (LTE) or fifth generation (5G) technology are being deployed to provide highly reliable, secure, closed cellular wireless networks with high bandwidth and low latency. As with a public cellular wireless network, access to the private cellular wireless network can be based on credentials provided by a service provider and installed in a wireless device. The wireless device can include one or more subscriber identity modules (SIMs) and/or electronic SIMs (eSIMs) for access to one or more private cellular wireless networks. The wireless device can also include one or more SIMs/eSIMs for access to one or more public cellular wireless networks. In single-radio wireless devices, cellular wireless baseband resources can be used for connections to a public cellular wireless network or a private cellular wireless network, but not both simultaneously. Public cellular wireless networks are more ubiquitously deployed, while private cellular wireless networks are targeted to specific localized areas. As described herein, targeted use of cellular wireless baseband resources to search for and attach to a private cellular wireless network opportunistically can reduce interruptions to public cellular wireless network access and reduce unnecessary cell search and radio link monitoring.

The wireless device maintains a set of geographic locations at which the wireless device is regularly used, such as home, work, school, gym, and the like. The frequent locations are determined based on geo-clustered location coordinate data correlated with time of day and duration spent at each frequent location. Private cellular wireless networks may be deployed at one or more frequent locations. The wireless device can perform a learning process to characterize private cellular networks found at the one or more frequent locations. During an initial private cellular wireless network learning process, the wireless device scans for cells, attempts to attach to cells, measures serving cells and neighbor cells, and takes note of attachment acceptances and attachment rejections as well as out of service (OOS) conditions for each cell. In some embodiments, the initial private cellular wireless network learning process is limited to frequent locations associated with use of the wireless device to conserve power and search resources of the wireless device. Different private cellular wireless networks can use an identical public land mobile network (PLMN) identifier (ID) value and share one or more radio frequency carriers. By scanning for and attempting network attachments, the wireless device learns which cells of private cellular wireless networks are accessible and which cells are inaccessible for the SIMs/eSIMs of the wireless device. The wireless device builds a database of private cellular wireless networks that are found at one or more locations and characterizes the private cellular wireless networks using information gathered in the learning process. The wireless device can determine neighbor cells of serving cells to optimize neighbor cell measurement and handover (or reselection) within a private cellular wireless network.

After an initial private cellular wireless network learning process, the wireless device can predict an early entrance to a frequent location, an early exit from a frequent location, and/or one or more expected next frequent locations to allow wireless circuitry of the wireless device to enable (activate) and disable (deactivate) SIMs/eSIMs that provide access to private cellular wireless networks at the frequent locations before entering and before leaving the frequent locations. The wireless device performs radio frequency scan searches and attempts access network attachment at known frequent locations for enabled SIMs/eSIMs using parameters specific to one or more private cellular wireless networks available to the wireless device at the frequent location. While connected to private cellular wireless networks, the wireless device updates the database characterizing serving cell regions of the private cellular wireless networks based on a history of signal strength measurements correlated with location coordinates at which the measurements are taken. The database can include information for cells of private cellular wireless networks, such as global cell identifier (GCI) values for a serving cell and adjacent neighbor cells, signal strength values at handover (or reselection) between serving cells and adjacent neighbor cells, a center point location coordinate value at which a highest signal strength value was measured in a serving cell, and a notification radius value indicating a distance from the center point of the serving cell to an edge of the serving cell at which an out of service (OOS) condition occurs. The wireless device can use information in the database to determine when to scan for a neighbor cell for handover (or reselection) more quickly. In some embodiments, the wireless device uses on-device processing of cell access success rates, wireless resource usage statistics, and/or measured interference levels to determine whether a serving cell is highly loaded and lacks sufficient wireless resources for data requirements of the wireless device. The wireless device can determine to reselect to a neighbor cell when the neighbor cell's interference levels and/or wireless resource levels are sufficient to satisfy the wireless device and may provide a superior connection to the private cellular wireless network than the serving cell.

On-device learning processes that initially characterize the cells for the database can subsequently be used to re-learn and update the database as private cellular wireless networks change, e.g., cells added/deleted, changes to access privileges for eSIMs/SIMs, user-specific frequent location changes, user-triggered successful private cellular wireless network searches, and cell characterization data refinement. Data gathered by the wireless device during the initial learning process and during subsequent re-learning processes can be organized into data vectors and grouped into clusters using vector quantization k-means processes to associate sets of measurements and observations with specific individual cell regions of private cellular wireless networks. Knowing where and when the wireless device is likely to be entering or exiting a private cellular wireless network, to which the wireless device has SIMs/eSIMs that grant access, can allow the wireless device to target use of cellular baseband resources appropriately. By enabling SIMs/eSIMs specific to private cellular wireless networks at learned frequent locations and otherwise keeping the private cellular wireless network SIMs/eSIMs disabled, the wireless device conserves limited battery resources to avoid searching for private cellular wireless networks unnecessarily and allows shared cellular baseband resources to be used by SIMs/eSIMs associated with public cellular wireless networks with less interruption.

These and other embodiments are discussed below with reference to FIGS. 1 through 13; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-*n* can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is downloaded and installed to the eUICC 108 or a user installs a UICC 118 that stores a physical SIM (pSIM). In some embodiments, the eUICC 108 obtains one or more eSIMs from one or more associated provisioning servers 116. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
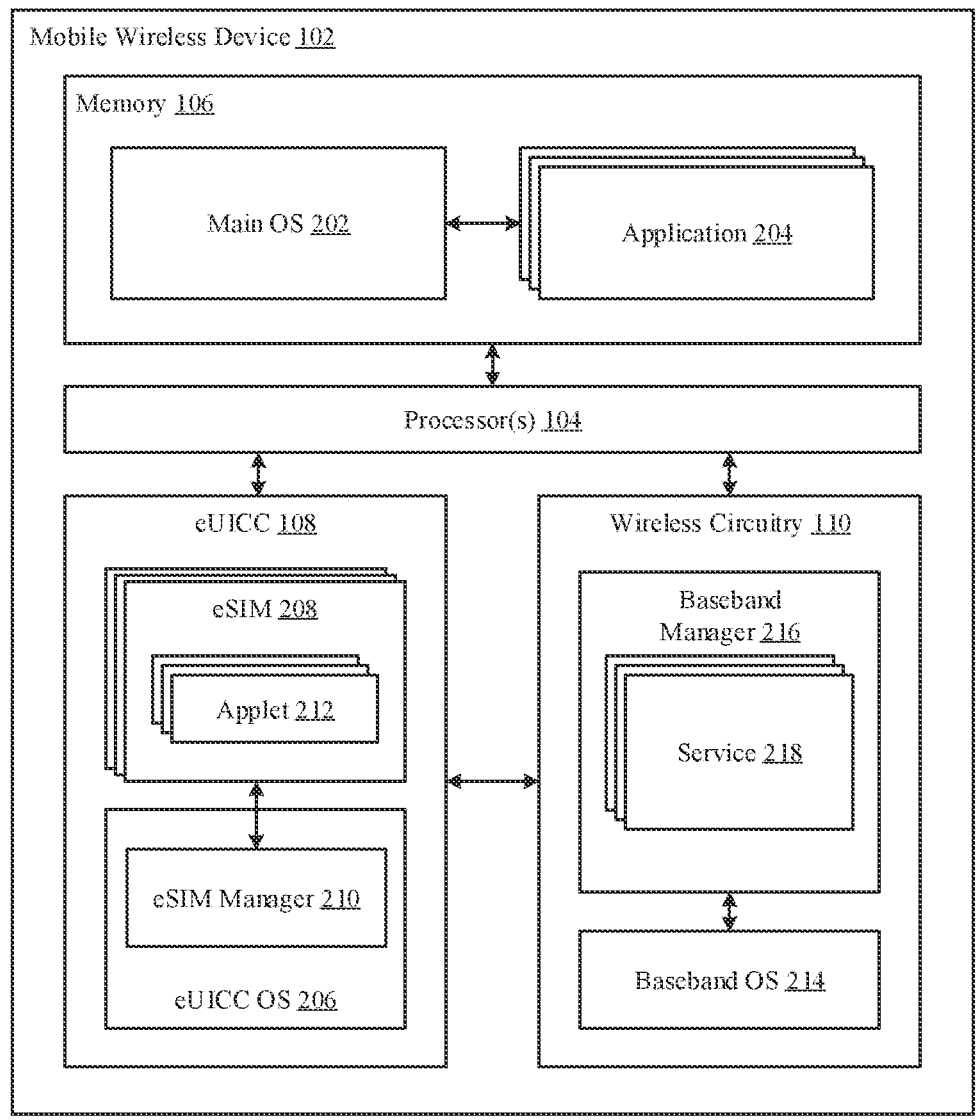
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
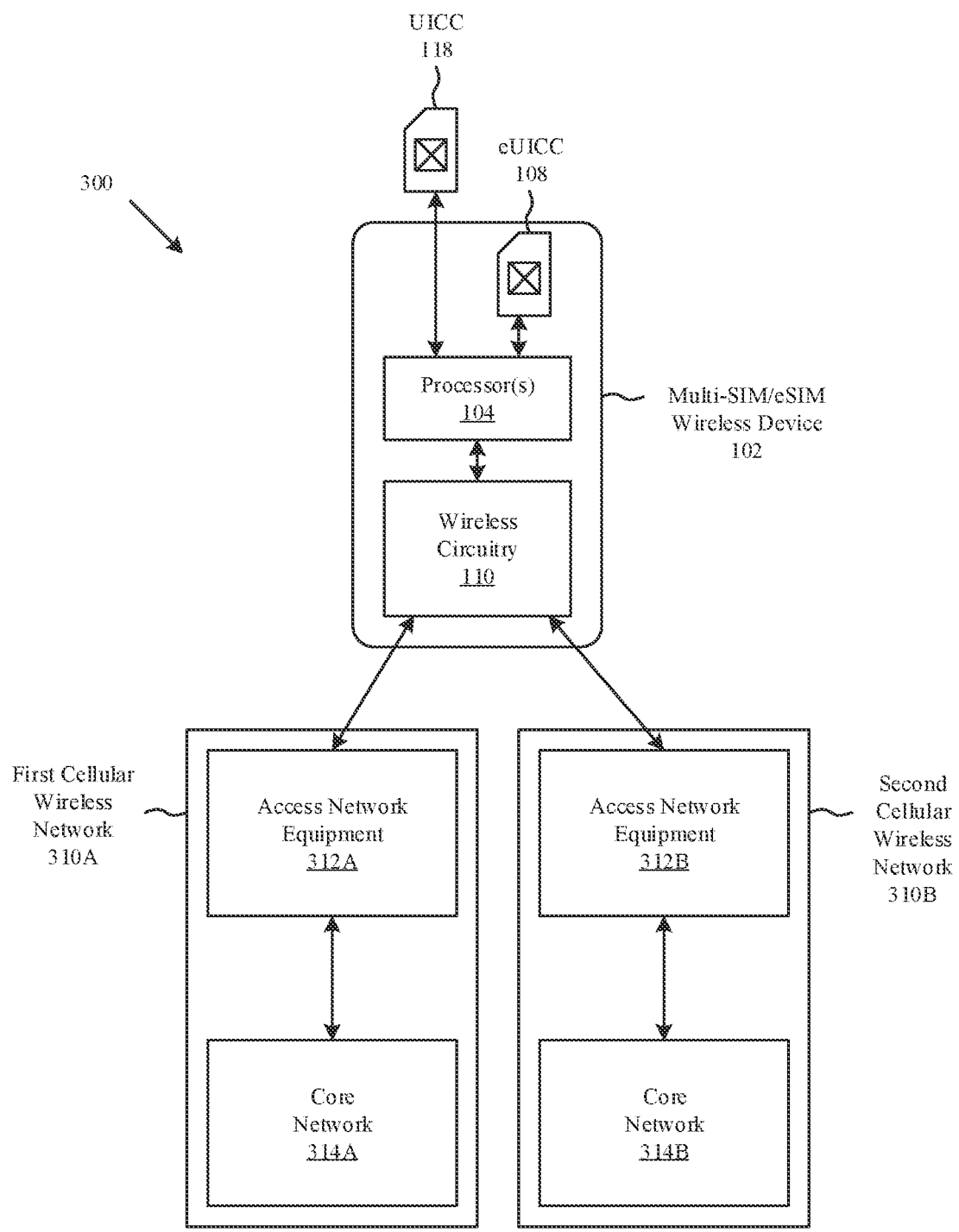
FIG. 3A illustrates a diagram of an exemplary wireless device having both a SIM and an eSIM and configured to connect to different cellular wireless networks, according to some embodiments.

FIG. 3A illustrates a diagram 300 of components of a multi-SIM/eSIM wireless device 102 including one or more processor(s) 104 and wireless circuitry 110 that provides for wireless radio frequency (RF) connections between the multi-SIM/eSIM wireless device 102 and a first cellular wireless network 310A and a second cellular wireless network 310B. The first cellular wireless network 310A includes access network equipment 312A for connecting to the multi-SIM/eSIM wireless device 102 and interfacing with a corresponding core network 314A. The second wireless network 310B, similarly, includes access network equipment 312B for connecting to the multi-SIM/eSIM wireless device 102 and interfacing with a corresponding core network 314B. In some embodiments, the wireless circuitry 110 includes one or more baseband processor(s), and a set of RF analog front-end circuitry. The wireless circuitry 110 can include components of RF analog front-end circuitry, e.g., a set of one or more antennas, which can be interconnected with additional supporting RF circuitry that can include filters and other analog components that can be "configured" for transmission and/or reception of analog signals via one or more corresponding antennas to one of the first and second cellular wireless networks 310A/B. In some embodiments, the multi-SIM/eSIM wireless device 102 can include hardware restrictions that limit the multi-SIM/eSIM wireless device 102 to connect to only one of the first and second cellular wireless networks 310A/110B via their respective access network equipment 312A/312B at a time. In some embodiments, when the multi-SIM/eSIM wireless device 102 has an active connection via the access network equipment 312A of the first cellular wireless network 310A, the multi-SIM/eSIM wireless device 102 can be precluded from establishing another active connection via the access network equipment 312B of the second cellular wireless network 310B. While connected to the first cellular wireless network 310A, the multi-SIM/eSIM wireless device 102 can temporarily switch the wireless circuitry 110 to search for and/or measure radio frequencies of the second cellular wireless network 310B. As discussed further herein, the multi-SIM/eSIM wireless device 102 can selectively search for and connect to private cellular wireless networks at known frequent locations after a learning process to minimize interruption of connections and/or access to public cellular wireless networks, which are generally more widely available. While the multi-SIM/eSIM wireless device 102 illustrated in FIG. 3A includes a removable UICC 118 and an eUICC 108, alternative architectures to realize multi- SIM, multi-eSIM, or multi-SIM/eSIM wireless devices 102 can be used as shown in FIG. 3B.

Figure 3B:
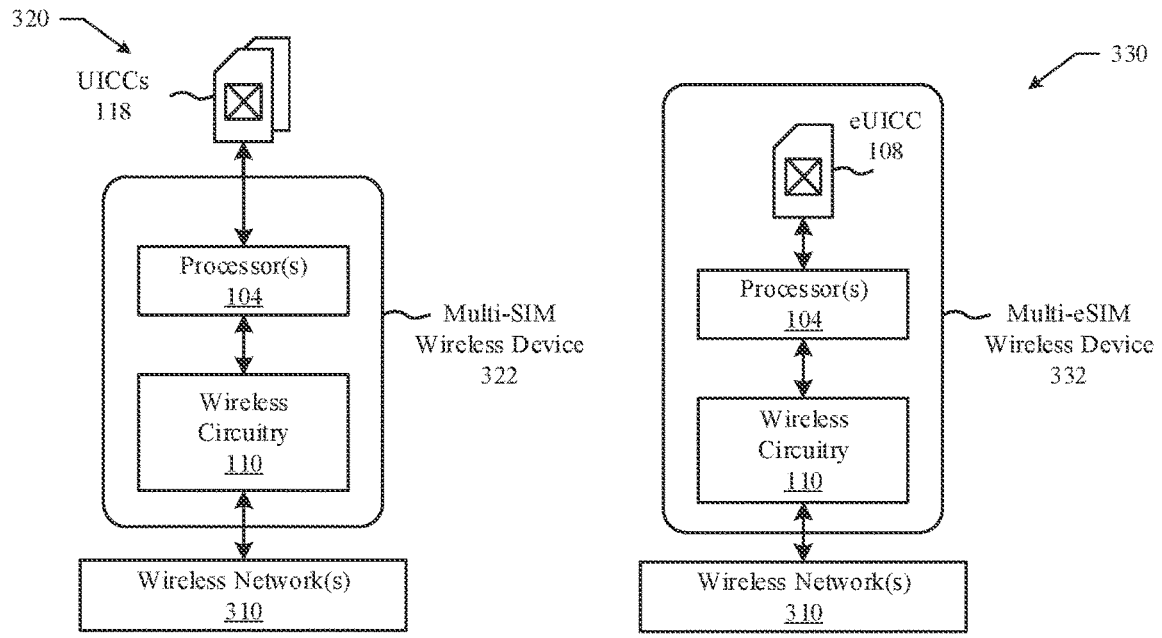
FIG. 3B illustrates diagrams of additional exemplary wireless devices that support multiple SIMs and/or eSIMs, according to some embodiments.
Figure 3B:
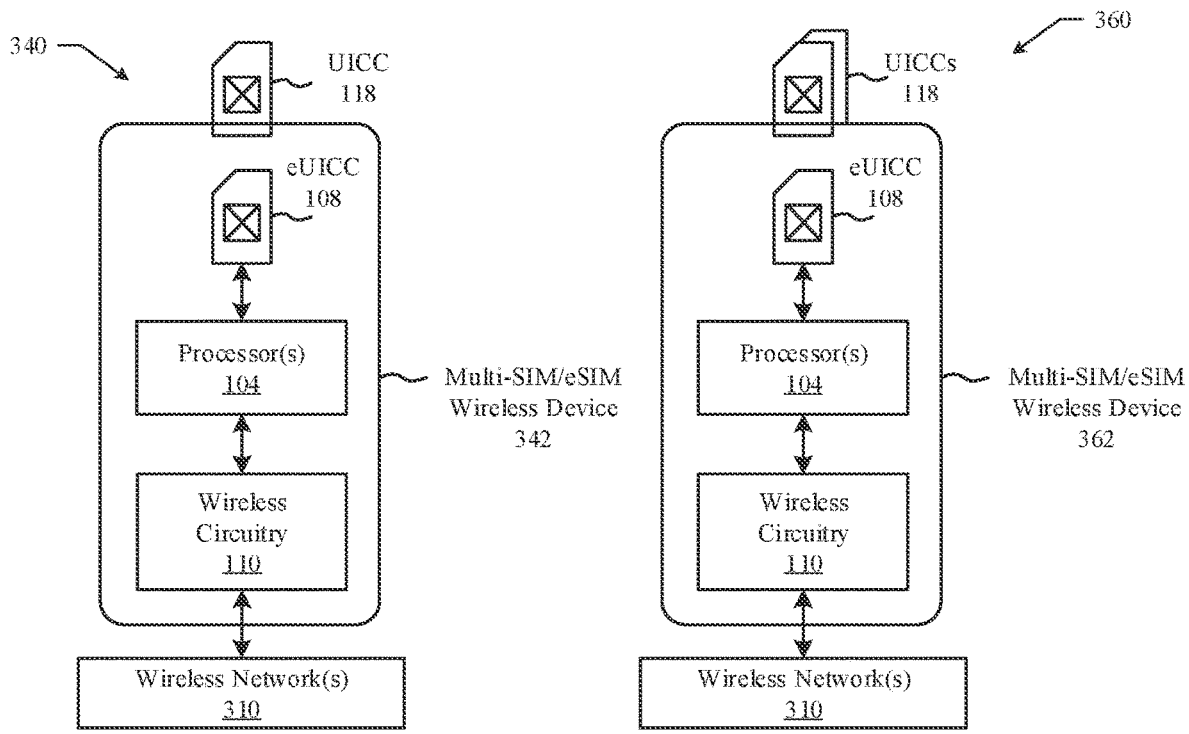

FIG. 3B illustrates diagrams for additional wireless devices that support multiple subscriber identities using removable UICCs with SIMs and/or eUICCs with eSIMs implemented thereon. As illustrated in diagram 320, a multi-SIM wireless device 322 includes multiple UICCs 118, which can be inserted and removed individually or together, and communicate with one or more processors 104 that connect to wireless circuitry 110 that provides for wireless communication with one or more wireless networks 310. As the physical size and design of the multi-SIM wireless device 322 can limit the number of UICCs 118 that can be supported, alternatively, as illustrated in diagram 330, a multi-eSIM wireless device 332 can include an eUICC 108 connected with the processor(s) 104 and to the wireless network(s) 310 via the wireless circuitry 110. Diagram 340 illustrates an exemplary multi-SIM/eSIM wireless device 342 that includes a removable UICC 118, on which can be installed one or more SIMs, and an eUICC 108 on which one or more eSIMs 208 can be installed. The multi-SIM/eSIM wireless device 342 can represent another form of the multi-SIM/eSIM wireless device 102 of FIG. 3A. The combination of SIMs on the UICC 118 and/or eSIMs 208 on the eUICC 108 can provide for connections to one or more wireless networks 310 using the wireless circuitry 110 under the control of the processor(s) 104 of the multi-SIM/eSIM wireless device 342. Diagram 360 illustrates another multi-SIM/eSIM wireless device 362 that includes multiple UICCs 118, on which one or more SIMs can be installed, and an eUICC 108, on which one or more eSIMs 208 can be installed. The combination of SIMs on the UICCs 118 and/or eSIMs 208 on the eUICC 108 can provide for connections to one or more wireless networks 310 using the wireless circuitry 110 under the control of the processor(s) 104 of the multi-SIM/eSIM wireless device 362. In general, a multi-SIM/eSIM wireless device 102 that supports multiple subscriber identities can include (i) at least one UICC 118 that supports multiple SIMs, (ii) an eUICC 108 that supports multiple eSIMs 208, or (iii) a combination of UICC 118 and eUICC 108. Each UICC 118 can support one or more SIMs, and each eUICC 108 can support one or more eSIMs 208. Each SIM on a UICC 118 and eSIM 208 on an eUICC 108 can store credentials for access to a public cellular wireless network or a private cellular wireless access network.

Figure 4:
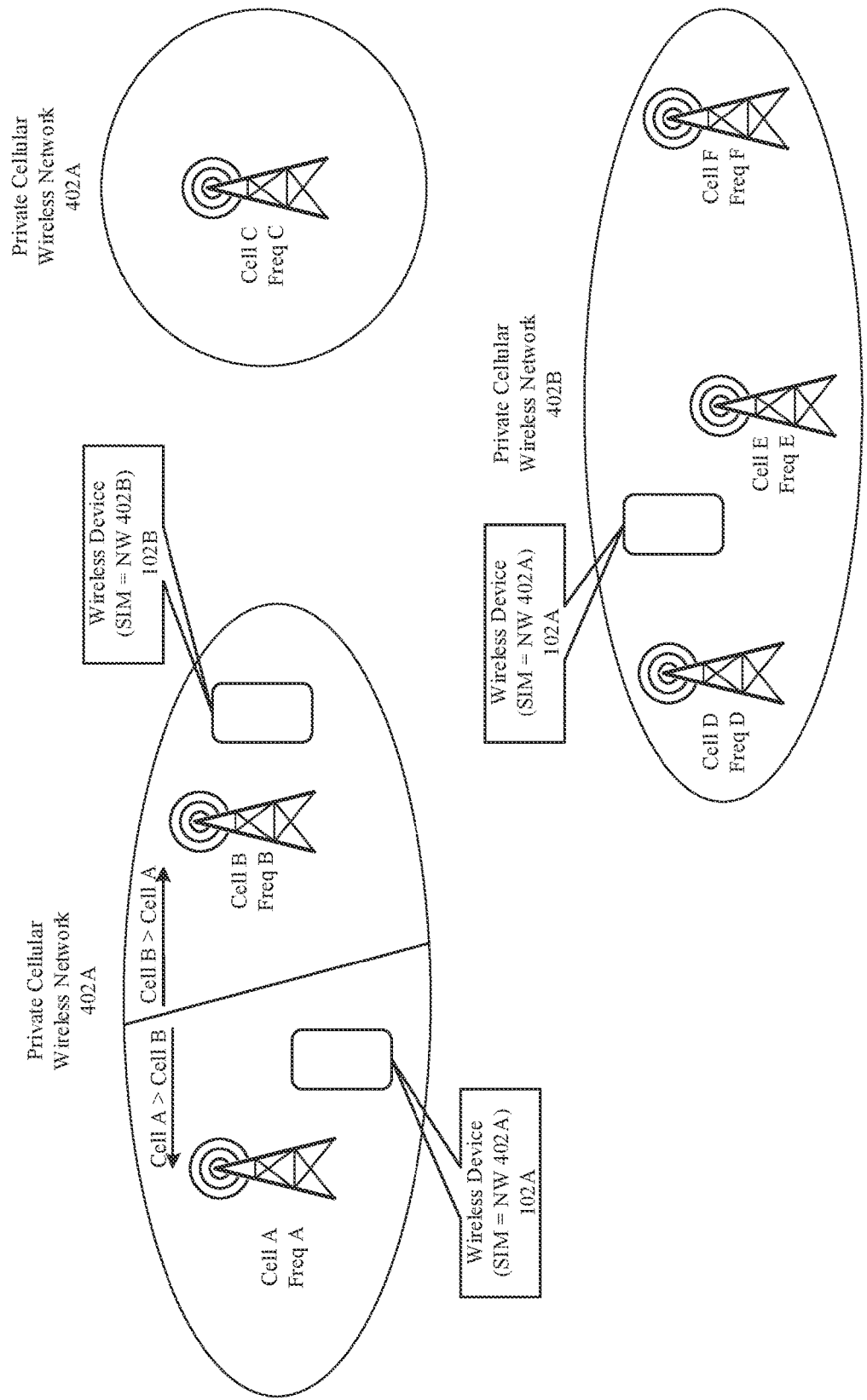
FIG. 4 illustrates an overview diagram of a personalized private cellular wireless network, according to some embodiments.

FIG. 4 illustrates an overview diagram 400 of personalized private cellular wireless network management. A wireless device 102 adapts scanning for and attachment to private cellular wireless networks based on an on-device learned database that characterizes aspects of cell regions of private cellular wireless networks known to the wireless device 102. FIG. 4 includes a first private cellular wireless network 402A with two geographically separated locations and a second private cellular wireless network 402B with one location. A first location of the first private cellular wireless network 402A includes a first cell A, which communicates on radio frequency A, and a second cell B, adjacent to cell A, which communicates on radio frequency B. In region A of the first location, a signal strength, e.g., a reference signal received power (RSRP) value, of the first cell A is stronger than a signal strength of the second cell B. In region B of the first location, the signal strength of the second cell B is stronger than the signal strength of the first cell A. Cell B is a neighbor cell of cell A, while cell A is a neighbor cell of cell B. A second location of the first private cellular wireless network 402A includes a third cell C that communicates on radio frequency C with no neighbor cells. Separately the second private cellular wireless network 402B includes cell D, which communicates on radio frequency D, cell E, which communicates on radio frequency E, and cell F, which communicates on radio frequency F. FIG. 4 also includes two different wireless devices, a first wireless device 102A that includes a SIM (or eSIM 208) associated with the first private cellular wireless network 402A, and a second wireless device 102B that includes a SIM (or eSIM 208) associated with the second private cellular wireless network 402B.

The first wireless device 102A scans for a public land mobile network (PLMN) identifier (ID) and radio frequencies associated with the first private cellular wireless network 402A. The first wireless device 102A does not scan for cells of the second private cellular wireless network 402B, as the first wireless device 102A does not include a SIM (or eSIM 208) associated with the second private cellular wireless network 402B. Within radio frequencies assigned to the first private cellular wireless network 402A, the first wireless device 102A searches for and scans only those radio frequencies available at a frequent location associated with the private cellular wireless network 402A. When near or in cell A or cell B, which is adjacent to cell A, the first wireless device 102A scans for radio frequencies associated with cells A and B. The first wireless device 102A can include in a database an estimate of a geographic extent of each cell of the first private cellular wireless network 402A (and/or of other private cellular wireless networks), e.g., an estimated center point for each cell and an estimated radius of each cell, and use that information along with previous signal strength measurements to determine when to measure an adjacent neighbor cell for handover (or reselection) from a serving cell. For example, the first wireless device 102A while attached to serving cell A can begin to measure neighbor cell B when nearing the boundary between cell A and cell B. In some embodiments, when cell B can provide adequate service and cell A is too crowded (which can be determined based on cell access success rates, wireless resource usage statistics, and measured interference levels for cell A), the first wireless device 102A can reselect from cell A to cell B. When the first wireless device 102A operates in a geographic area covered by the second private cellular wireless network 402B, the first wireless device 102A should not activate its SIM (or eSIM 208) associated with the first private cellular wireless network 402A, as the first private cellular wireless network 402A is not available. This can include when the second private cellular wireless network 402B uses the same PLMN ID and/or the same radio frequencies as the first private cellular wireless network 402A. Similarly, the second wireless device 102B, when located in the first private cellular wireless network 402A should not activate its SIM (or eSIM 208) associated with the second private cellular wireless network 402B.

Figure 5:
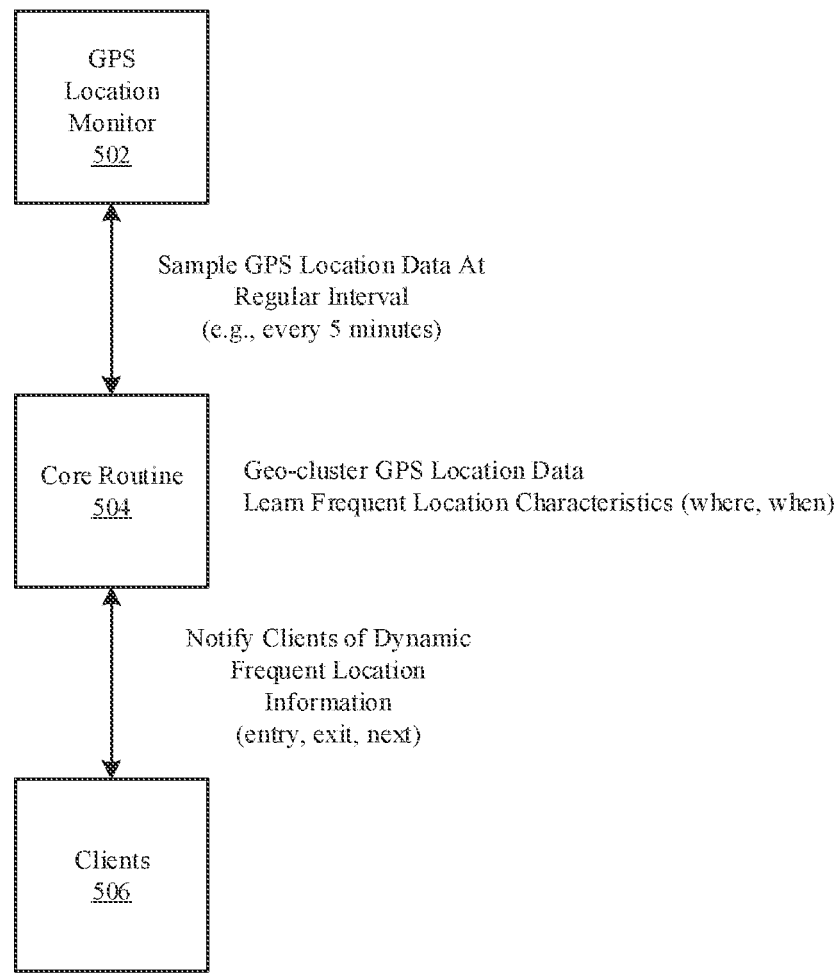
FIG. 5 illustrates a diagram of exemplary modules included in a wireless device for frequent location learning, according to some embodiments.

FIG. 5 illustrates a diagram 500 of exemplary modules included in a wireless device 102 and used for learning frequent locations visited by the wireless device 102. A global positioning system (GPS) location monitor module 502 (or another similar geo-location hardware module) provides GPS data at regular intervals, e.g., every five minutes, to a core routine module 504. The core routine module 504 sorts the GSP data using geo-clustering, e.g., based on time of day visited and duration spent, to learn frequent locations personalized to a user of the wireless device 102. Examples of frequent locations where the wireless device 102 can routinely be used include a work location, a school location, a gym location, a residential location, a shopping location, etc. The core routine module 504 can determine a set of frequent locations and determine characteristics of when, where, and/or how the wireless device 102 is used at the frequent locations. Representative characteristics for a frequent location can include one or more sets of location coordinates and days of week/times of day the wireless device 102 is used at the frequent location. The core routine module 504 can periodically monitor use of the wireless device 102 to update characteristics of the set of determined frequent locations, e.g., add a location, drop a location, and/or change days/times associated with a location. The core routine module 504 can notify one or more client modules 506, such as a communication center module on the wireless device 102 that manages communication functions for the wireless device 102, of dynamically changing information regarding the frequent locations, e.g., predicted entry, nearing entry, or actual entry to a frequent location, predicted exit, nearing exit or actual exit from a frequent location, and/or a predicted next frequent location to be visited. Based on historical observations of the use of the wireless device 102 at various locations, the core routine module 504 can predict when and where the wireless device 102 is likely to be used.

Figure 6A:
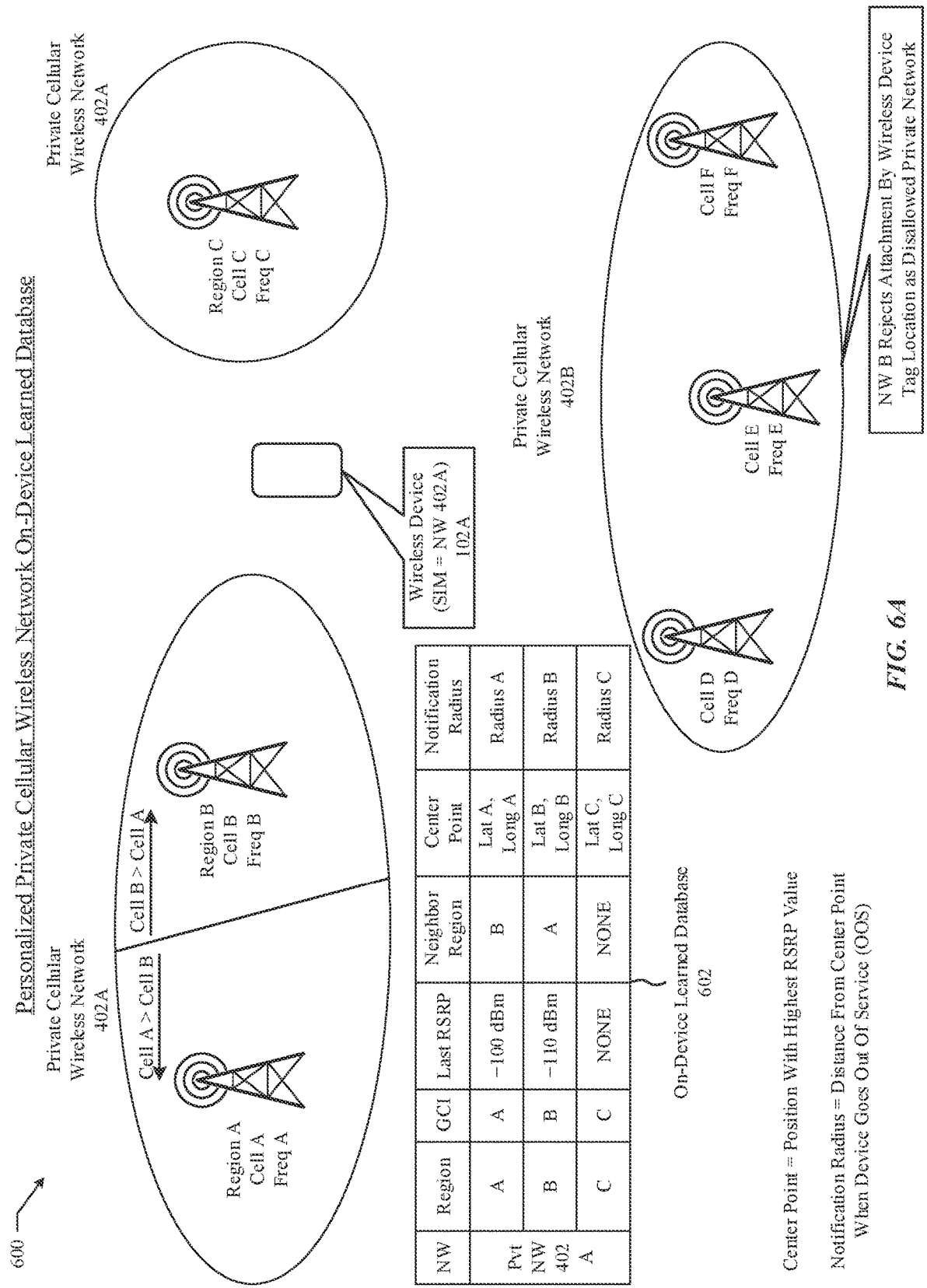
FIG. 6A illustrates a diagram of an exemplary on-device learned database characterizing private cellular wireless networks, according to some embodiments.

FIG. 6A illustrates a diagram 600 of an exemplary on-device learned database 602 that characterizes a first private cellular wireless network 402A for the wireless device 102A, which includes a SIM (or eSIM 208) associated with the first private cellular wireless network 402A. The wireless device 102A can scan and attach to cells A, B, or C of the first private cellular wireless network 402A and accumulate information regarding signal strength at various geographic locations with each cell, including at cell boundaries before (or when) a handover, a reselection, or an out of service (OOS) condition occurs. The on-device learned database includes entries that characterize each learned cell region of the first private cellular wireless network 402A. For example, each cell region is associated with a unique global cell identifier (GCI) value, can include a most recent (last) signal strength value, e.g., a last RSRP measurement value, taken before a handover (or reselection) occurred to a neighbor cell region, can abut one or more neighbor cell regions, has an estimated center point at particular location coordinates (e.g., latitude and longitude values associated with a highest measured signal strength), and extends outward from the center point to approximately a notification radius distance value (e.g., based on a previously noted change from an in-service condition to an OOS condition). Isolated cell regions of a private cellular wireless network, such as cell region C of the first private cellular wireless network 402A, can have no neighbor cell regions and no associated last RSRP values associated with handover (or reselection). The wireless device 102A may not include a SIM (or eSIM 208) associated with a second private cellular wireless network 402B. The wireless device 102A can receive an attach reject message from a second private cellular wireless network 402B responsive to an attempt to attach to the second private cellular wireless network 402B indicating that the second private cellular wireless network 402B is disallowed for use by the wireless device 102A. In some embodiments, the on-device learned database 602 includes an indication of whether a private cellular wireless network 402A, 402B is allowed or disallowed for use by the wireless device 102A. When the wireless device 102A detects and is able to attach to a new cell region of a known private cellular wireless network 402A, the cell region and characteristics determined by the wireless device 102A for the cell region can be added to the on-device learned database 602. The wireless device 102A can also keep track of the highest measured signal strength (e.g., RSRP value) measured within a cell region and update the center point value stored in the on-device learned database 602 based on the measurements. The wireless device 102A can further keep track of a distance from the center point to a location where an OOS condition occurs to estimate a radius extending from the center point to characterize a geographic extent of the cell region. In some embodiments, the wireless device 102A can use the notification radius to determine when to trigger searching for the first private cellular wireless network 402A, e.g., when determining the wireless device 102A is nearing but not yet entered the first private cellular wireless network 402A.

Figure 6B:
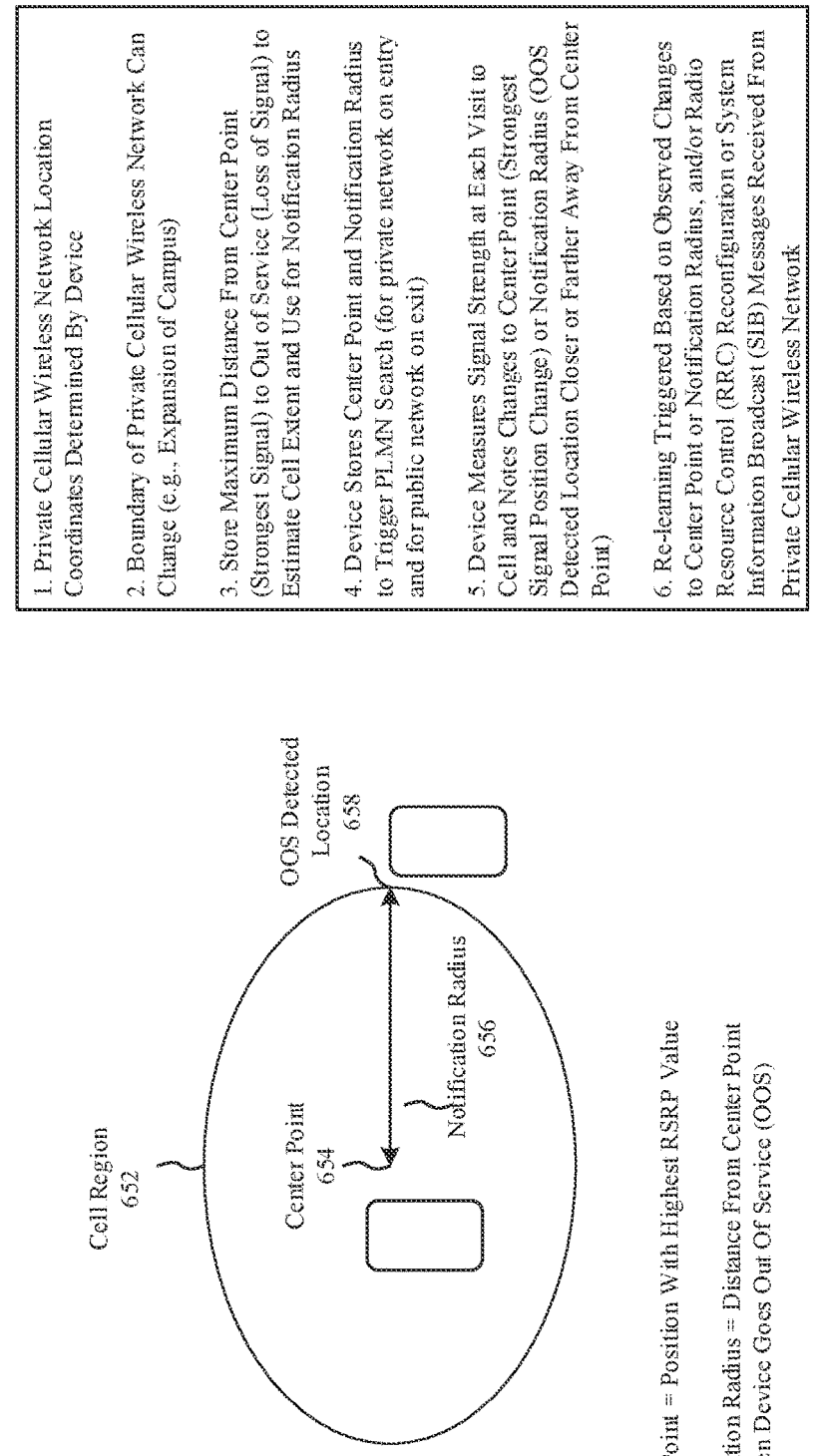
FIG. 6B illustrates a diagram of key characteristics for a cell region of a private cellular wireless network, according to some embodiments.

FIG. 6B illustrates a diagram 650 of key characteristics determined by a wireless device 102 for a cell region 652 of a private cellular wireless network. The wireless device 102 measures signal strength while attached to the cell region 652 and maintains a geographic location (e.g., latitude and longitude values) for a center point 654 value in the on-device learned database 602 for the cell region 652 based on a highest measured received signal strength, e.g., highest RSRP value. The wireless device 102 can also note geographic locations for entry points and exit points, where exit points can be determined based on when an out of service (OOS) condition occurs indicating a point at which signal strength of the cell region 652 is insufficient to maintain an attachment by the wireless device 102 to the private cellular wireless network. The wireless device 102 can use the OOS detected location 658 to estimate a geographic extent of the cell region and store a notification radius 656 in the on-device learned database 602. The notification radius 656 and the center point 654 can be used, in some embodiments, to determine (or predict) entry to or exit from the cell region 652. Boundaries of the private cellular wireless network can change over time, such as when a campus of a work location expands or contracts. The wireless device 102 can trigger re-learning of characteristics of a private cellular wireless network to update the on-device learned databased 602. Re-learning can be triggered based on observed changes to a location of the center point (e.g., a position of maximum signal strength moves), based on observed changes to the notification radius (e.g., OOS occurs closer to or farther from the center point than expected), and/or based on radio resource control (RRC) reconfiguration or system information broadcast (SIB) messages received from the private cellular wireless network.

Figure 7:
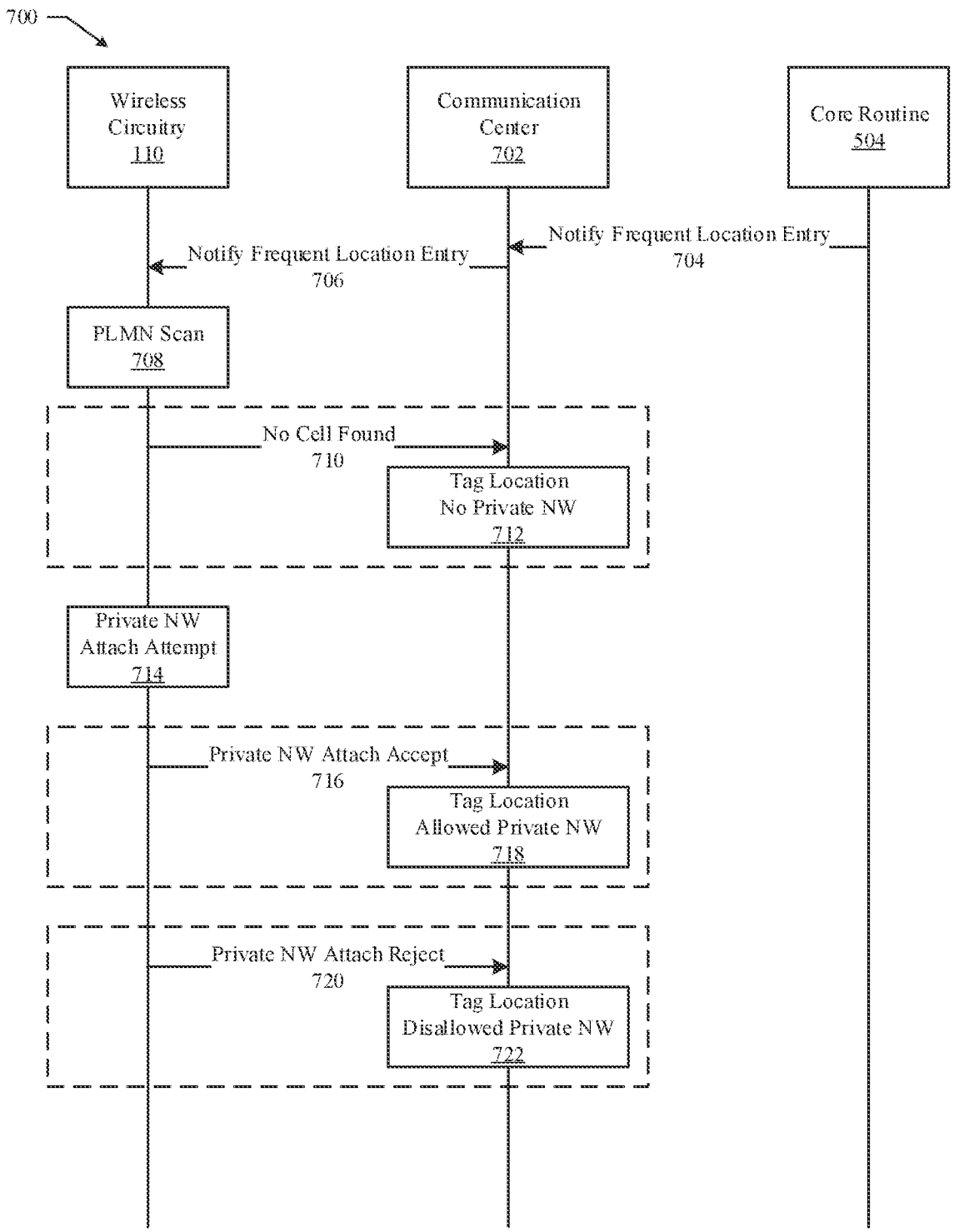
FIG. 7 illustrates a diagram of an example of tagging frequent locations based on locating private cellular wireless networks, according to some embodiments.

FIG. 7 illustrates a diagram 700 of an example of tagging frequent locations based on searching for and attempting attachments to private cellular wireless networks at the frequent locations. At 704, the core routine module 504 provides a notification message to the communication center module 702 indicating that the wireless device 102 is entering, is nearing entry to, or is predicted to enter a frequent location. In some embodiments, the notification message from the core routine module 504 includes one or more specific radio frequencies or other network parameters to use for searching for one or more private cellular wireless networks at the frequent location. At 706, the communication center module 702 forwards the notification message to wireless circuitry 110 of the wireless device 102, e.g., to a baseband processor, which can use information in the notification message, e.g., network parameters, such as radio frequencies, to perform a PLMN scan, at 708, and attempt attachment to a private cellular wireless network at the frequent location. When no cell is found at the frequent location, the wireless circuitry 110, at 710, provides a notification message to the communication center module 702 indicating that no cell of one or more private cellular wireless networks was found at the frequent location. At 712, the communication center module 702 tags the frequent location as having no private cellular wireless networks, e.g., in a database or other record kept by the wireless device 102. When a cell of a private cellular wireless network is found, at 714, the wireless circuitry 110 attempts to attach to the cell of the private cellular wireless network. When the wireless device 102 successfully attaches to the cell of the private cellular wireless network, the wireless circuitry 110, at 716, sends a notification to the communication center module 702 indicating that an attach accept message was received from the private cellular wireless network, and at 718, the communication center module 702 tags the frequent location as having an allowed private cellular wireless network. When the wireless device 102 is rejected by the cell of the private cellular wireless network, the wireless circuitry 110, at 720, sends a notification to the communication center module 702 indicating that an attach reject message was received from the private cellular wireless network, and, at 722, the communication center module 702 tags the frequent location has having a disallowed private cellular wireless network. The wireless device 102 can learn about private cellular wireless networks at various frequent locations visited and accumulate that learning to inform future scanning and searching for private cellular wireless networks when visiting the frequent locations.

Figure 8A:
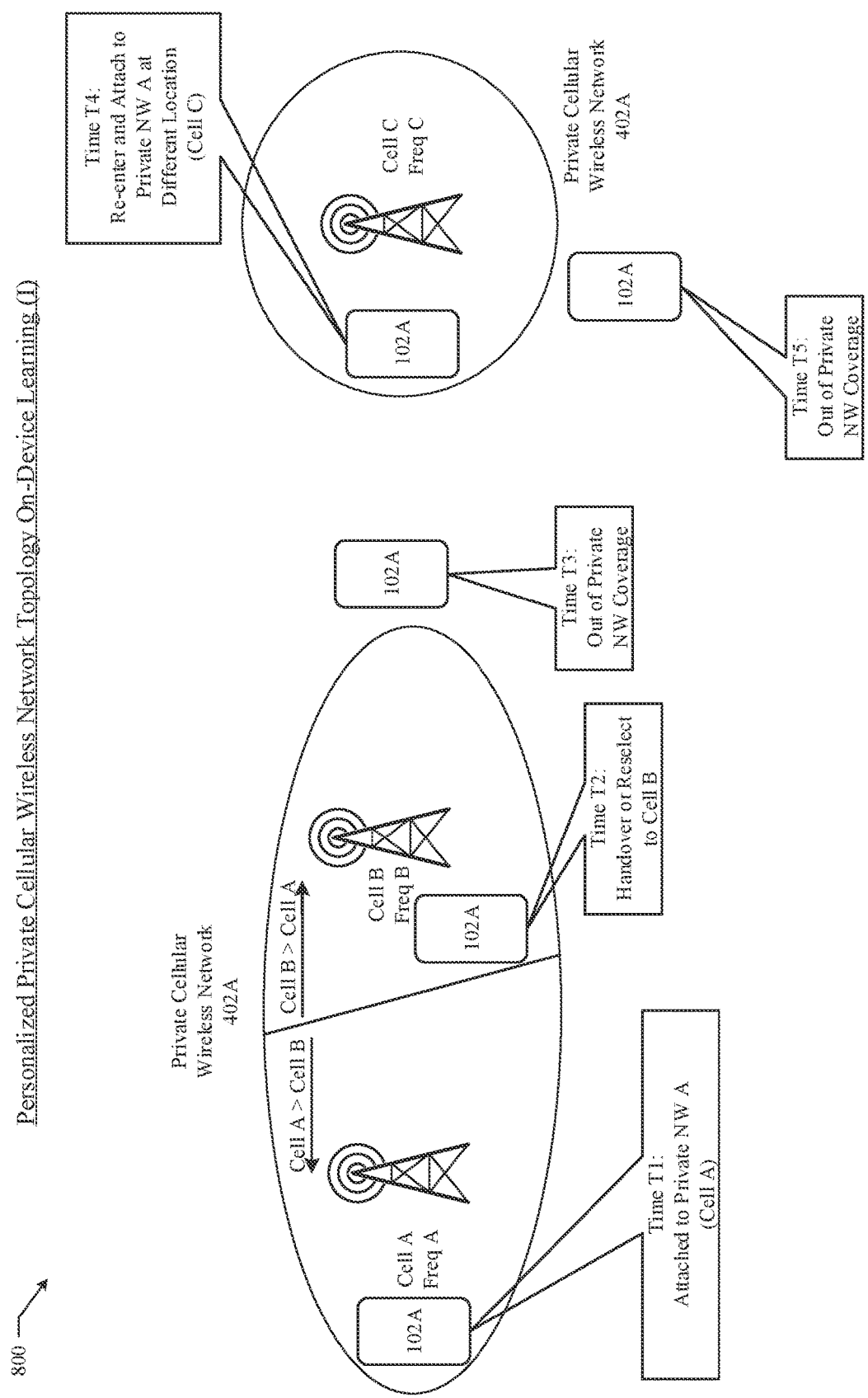
FIG. 8A illustrates an overview diagram of an example of on-device learning of a private cellular wireless network topology, according to some embodiments.

FIG. 8A illustrates an overview diagram 800 of an example of on-device learning of a private cellular wireless network topology by a wireless device 102A. The wireless device 102A includes a SIM (or eSIM 208) associated with a private cellular wireless network 402A. As the wireless device 102A moves throughout a geographic area, the wireless device 102A accumulates information regarding cells of the private cellular wireless network 402A. At time T1, the wireless device 102A attaches to cell A of the private cellular wireless network 402A. At time T2, the wireless device 102A executes a handover (or reselection) from cell A to cell B of the private cellular wireless network 402A. At time T3, the wireless device 102A exits coverage of the private cellular wireless network 402A. At time T4, the wireless device 102A re-enters the private cellular wireless network 402A and attaches to cell C, which is at a different location from cells A and B. At time T5, the wireless device 102A again exits cover of the private cellular wireless network 402A. Associated with each of these times T1 to T5, the wireless device 102A can perform various actions as illustrated in FIG. 8B.

Figure 8B:
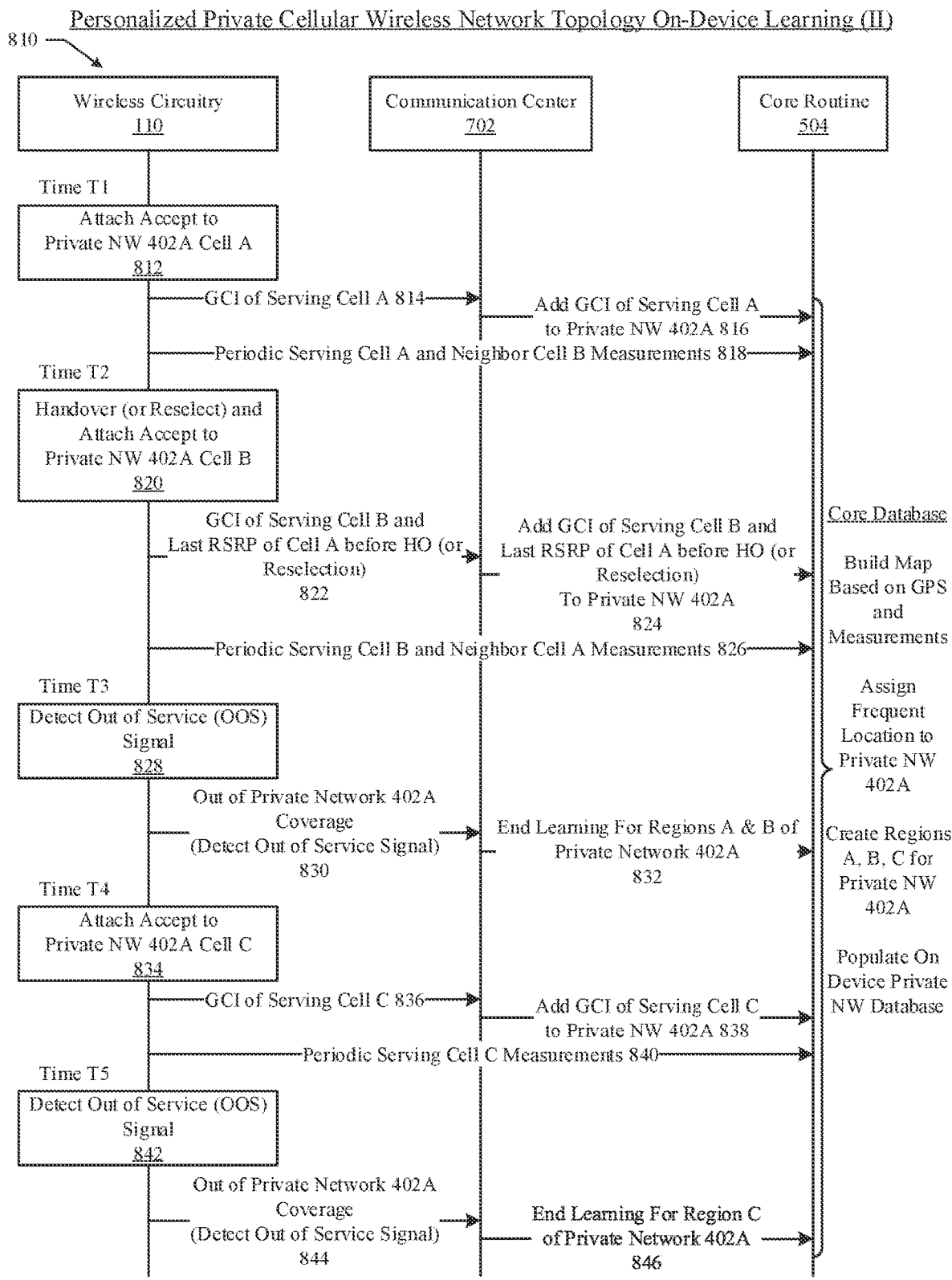
FIG. 8B illustrates a flowchart detailing the exemplary on-device learning of the private cellular wireless network topology, according to some embodiments.

FIG. 8B illustrates a flowchart 810 detailing actions of the on-device learning process performed by the wireless device 102A to characterize and build a database regarding the private cellular wireless network 402A while traversing the geographic area as shown in FIG. 8A. At 812 (time T1), the wireless circuitry 110 of the wireless device 102A successfully attaches to cell A of the private cellular wireless network 402A. At 814, the wireless circuitry 110 sends to the communication center module 702 a message that includes a GCI value of the serving cell A. At 816, the communication center module 702 sends to the core routine module 504 a message to add the GCI value of the serving cell A to an entry for the private cellular wireless network 402A in a database maintained by the core routine module 504. At 818, while attached to the serving cell A, the wireless circuitry 110 provides periodic measurements of the serving cell A and of neighbor cell B to the core routine module 504 (via the communication center module 702). The core routine module 504 builds a signal heat-map of cell regions A and B of the private cellular wireless network 402A by mapping measurements, e.g., received signal strength values, of the serving cell A and neighbor cell B with associated location coordinates (e.g., latitude and longitude values). At 820 (time T2), the wireless circuitry 110 of the wireless device 102A performs a successful handover (or reselection) process from serving cell A to neighbor cell B, which becomes the new serving cell for the wireless device 102A after the handover (or reselection). At 822, the wireless circuitry 110 provides to the communication center module 702 a message that includes the GCI of serving cell B and a most recently measured (last measured) signal strength (e.g., RSRP value) of the previous serving cell A acquired before the handover (or reselection) occurred. At 824, the communication center module 702 sends to the core routine module 504 a message indicating addition of the GCI of serving cell B and the last signal strength (e.g., RSRP value) measurement for cell A before handover (or reselection). At 826, the wireless circuitry 110 provides to the core routine module 504 (via the communication center module 702) periodic measurements of the serving cell B and the neighbor cell A. The core routine module 504 continues to build the signal heat-map of cell regions A and B of the private cellular wireless network 402A using the provided measurements and associated location coordinates. At 828 (time T3), the wireless circuitry 110 detects an out of service (OOS) signal indicating loss of coverage by cell B (or any other cell) of the private cellular wireless network 402A. At 830, the wireless circuitry 110 sends a message to the communication center module 702 indicating the loss of coverage (detected OOS signal) for the private cellular wireless network 402A. At 832, the communication center module 702 sends a message to the core routine module 504 indicating an end for learning cell regions A and B for the private cellular wireless network 402A. The core routine module 504 can associate a frequent location with the private cellular wireless network 402A, create database entries for cellular regions A and B, and populate the database entries based on the measurements and other information provided during the learning process for cells A and B. At 834 (time T4), the wireless circuitry 110 of the wireless device 102A successfully attaches to cell C of the private cellular wireless network 402A. At 836, the wireless circuitry 110 sends to the communication center module 702 a message that includes a GCI value of the serving cell C. At 838, the communication center module 702 sends to the core routine module 504 a message to add the GCI value of the serving cell C to a record of the private cellular wireless network 402A in the database maintained by the core routine module 504. At 840, while attached to the serving cell C, the wireless circuitry 110 provides periodic measurements of the serving cell C to the core routine module 504 (via the communication center module 702). The core routine module 504 builds a signal heat-map of cell region C of the private cellular wireless network 402A by mapping measurements, e.g., received signal strength values, of the serving cell C with associated location coordinates (e.g., latitude and longitude values). At 842 (time T5), the wireless circuitry 110 detects an out of service (OOS) signal indicating loss of coverage by cell C (or any other cell) of the private cellular wireless network 402A. At 844, the wireless circuitry 110 sends a message to the communication center module 702 indicating the loss of coverage (detected OOS signal) for the private cellular wireless network 402A. At 846, the communication center module 702 sends a message to the core routine module 504 indicating an end for learning cell region C for the private cellular wireless network 402A. The core routine module can create additional database entries for cellular region C and populate the database entries based on the measurements and other information provided during the learning process for cell C.

Figure 9:
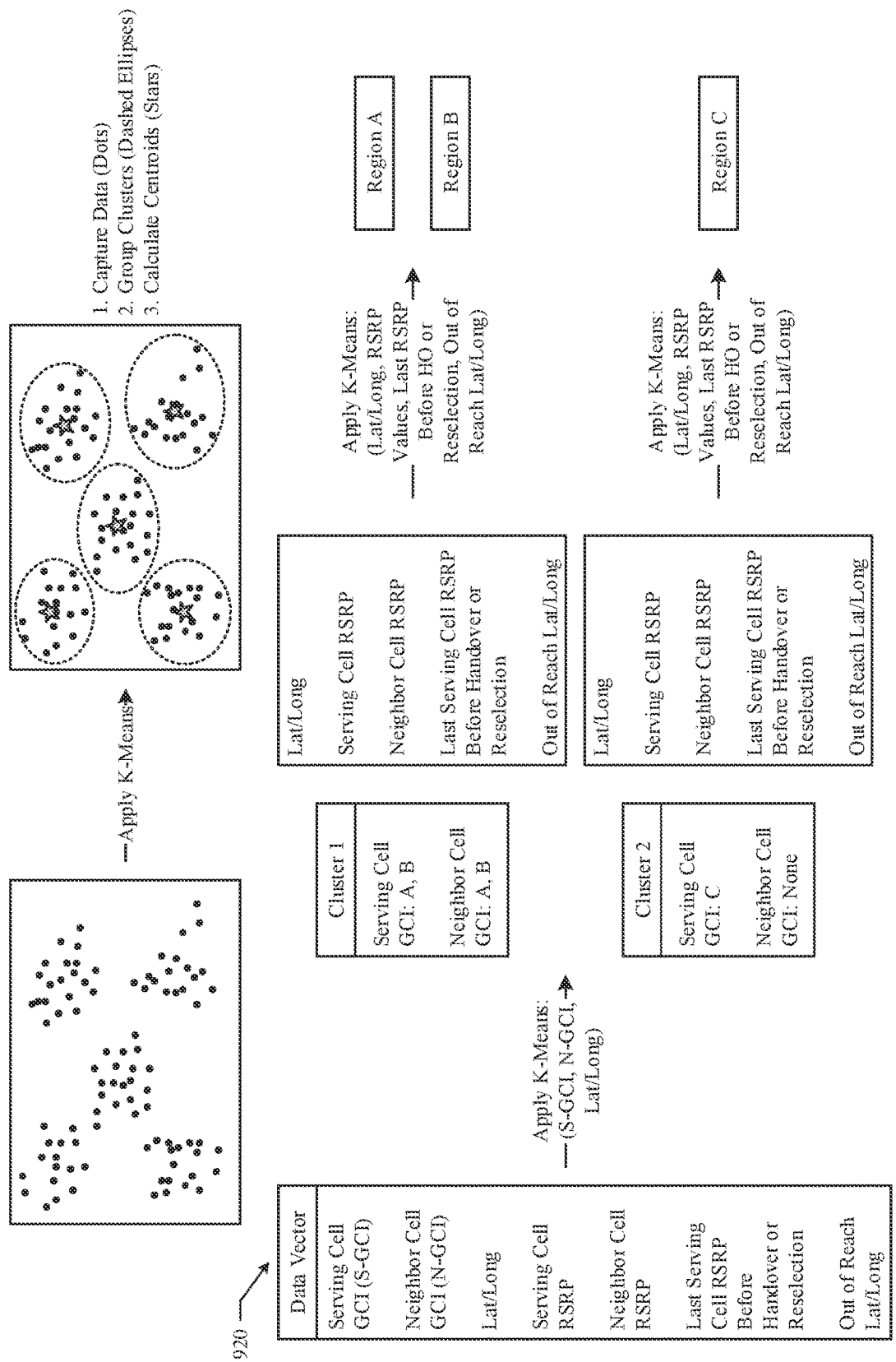
FIG. 9 illustrates a diagram of an example of cell region learning of a private cellular wireless network using a hierarchical k-means clustering process, according to some embodiments.

FIG. 9 illustrates a diagram 900 of an example of cell region learning of a private cellular wireless network by a wireless device 102 using a hierarchical k-means clustering process. As described for FIG. 8B, the wireless device 102 accumulates information such as signal strength measurements (e.g., RSRP values) correlated with location coordinates (e.g., latitude and longitude values) as well as identifiers for cellular regions of the private cellular wireless network. The wireless device 102 organizes the information into data vectors 920, which can include GCI values for a serving cell and a neighbor cell, location coordinates, signal strength measurements of the serving cell and the neighbor cell, a last measured signal strength for a serving cell before handover (or reselection) to a neighbor cell, and location coordinates when an out of service (OOS) condition is reached. The wireless device 102 applies a first vector quantization k-means process to the data vectors based on the serving cell GCI values, the neighbor cell GCI values, and the location coordinates associated with the serving cell GCI values and neighbor cell GCI values. As a result of the first vector quantization k-means process, the wireless device 102 separates the data vectors into clusters, such as a first cluster, corresponding to cell regions A and B associated with the combinations (serving cell A, neighbor cell B) and (serving cell B, neighbor cell A), and a second cluster, corresponding to cell region C associated with serving cell C with no associated neighbor cell. The wireless device 102 applies a second vector quantization k-means process to the data vectors in each cluster based on the signal strength values (e.g., RSRP values for the serving cell and the neighbor cell, the last measured RSRP value before handover (or reselection), and the OOS location coordinates). As a result of the second vector quantization k-means process, the wireless device 102 further separates the data into distinct cell regions, e.g., cell regions A, B, and C. The wireless device 102 can further use the separated data for each cell region to characterize the cell region, such as to determine a center point (e.g., using a centroid of location coordinates of data vectors for the cell region) and a radius estimate (e.g., based on a distance from OOS location coordinates to the determined center point).

Figure 10A:
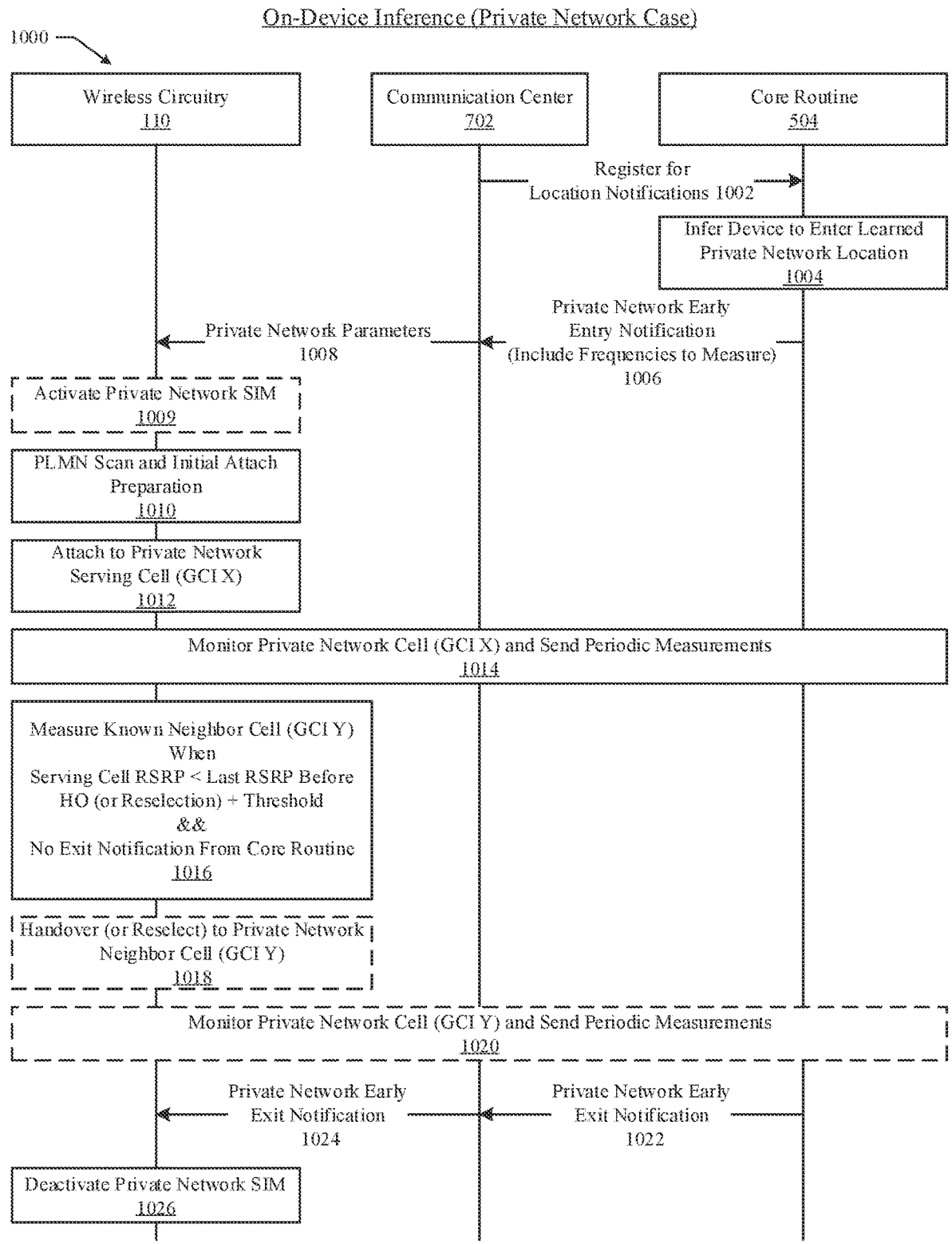
FIGS. 10A and 10B illustrate diagrams of an exemplary on-device inference process used for personalized private cellular wireless network management, according to some embodiments.

FIG. 10A illustrates a diagram 1000 of an on-device inference process used for personalized private cellular wireless network management by a wireless device 102 when a private cellular wireless network is known to be accessible at a particular location. At 1002, a communication center module 702 of the wireless device 102 sends a message to a core routine module 504 of the wireless device 102 to register for location notifications, such as a notification of a predicted or actual entry to a location or a notification of a predicted or actual exit from a location. In some embodiments, the location notifications are limited to frequent locations identified by the core routine module 504. In some embodiments, the location notifications are limited to locations at which private cellular wireless networks are known to the wireless device 102. At 1004, the core routine module 504 infers that the wireless device 102 will enter a previously learned frequent location at which one or more private cellular wireless networks are known. In some embodiments, the core routine module 504 uses information from a stored database compiled by the wireless device 102 and which characterizes cell regions of known private cellular wireless networks. In some embodiments, the core routine module 504 uses i) a learned notification radius and center point value of a private cellular wireless network and ii) location coordinates of the wireless device 102 to predict a forthcoming entry to the private cellular wireless network. At 1006, the core routine module 504 sends to the communication center module 702 a private network early entry notification message that includes one or more private network parameters to use for searching for and/or attaching to a cell of one or more private cellular wireless networks. In some embodiments, the notification message includes one or more radio frequencies to use for searching for cells of the one or more private cellular wireless networks. In some embodiments, the early entry notification message includes an identifier for a private cellular wireless network known at the frequent location to be entered. At 1008, the communication center module 702 forwards the private network parameters to the wireless circuitry 110 of the wireless device 102. In some embodiments, the private network parameters include specifications for one or more cellular regions of a private cellular wireless network known at the frequent location to be entered. At 1009, the wireless circuitry 110 activates (if not already activated) a private network SIM (or eSIM 208) associated with a private cellular wireless network identified by the private network parameters received at 1008. At 1010, the wireless circuitry 110 performs a PLMN scan based on the private network parameters and prepares for initial attachment to a cell of the private cellular wireless network. At 1012, the wireless circuitry 110 attaches to a serving cell (indicated by a GCI value 'X') of the private cellular wireless network. At 1014, the wireless circuitry 110 monitors the serving cell and sends periodic measurements (or other status information) of the serving cell to the communication center module 702 and/or the core routine module 504. At 1016, when a measured signal strength, e.g., an RSRP value, of the serving cell satisfies a handover (or reselection) measurement threshold, e.g., the serving cell RSRP value falls below a last RSRP value before handover (or reselection) plus a delta threshold value (to allow for early detection before handover or reselection would occur) and the wireless circuitry 110 has not received an early exit notification from the core routine module 504, the wireless circuitry 110 measures known neighbor cells, e.g., a neighbor cell indicated by a GCI value 'Y'. The wireless circuitry 110 knows neighbor cells of the serving cell, such as based on network characterization information provided by the communication center module 702. In some embodiments, the network parameters 1008 received from the communication center module 702 at 1008 include neighbor cell GCI values and search parameters (e.g., radio frequencies) and/or last RSRP values obtained previously before handover (or reselection) for the serving cell. The wireless circuitry 110 can proactively measure neighbor cells and prepare for handover (or reselection). At 1018, the wireless circuitry 110 performs a device-initiated handover (or reselection) process to transfer from the serving cell with GCI value 'X' to the neighbor cell with GCI value 'Y'. At 1020, the wireless circuitry 110 monitors the new serving cell 'Y' and sends periodic measurements (or other status information) of the serving cell 'Y' to the communication center module 702 and/or the core routine module 504. At 1022, the core routine module 504 sends to the communication center module 702 a private network early exit notification message indicating a predicted, forthcoming exit from the private cellular wireless network. At 1024, the communication center module 702 forwards the private network early exit notification message to the wireless circuitry 110. In some embodiments, the core routine module 504 uses i) a learned notification radius and center point value of the private cellular wireless network and ii) location coordinates of the wireless device 102 to predict a forthcoming exit from the private cellular wireless network. At 1026, the wireless circuitry 110 deactivates the private network SIM associated with the private cellular wireless network and returns baseband cellular resources of the wireless circuitry 110 to full-time use for another SIM/eSIM of the wireless device 102, e.g., a SIM/eSIM associated with a public cellular wireless network.

Figure 10B:
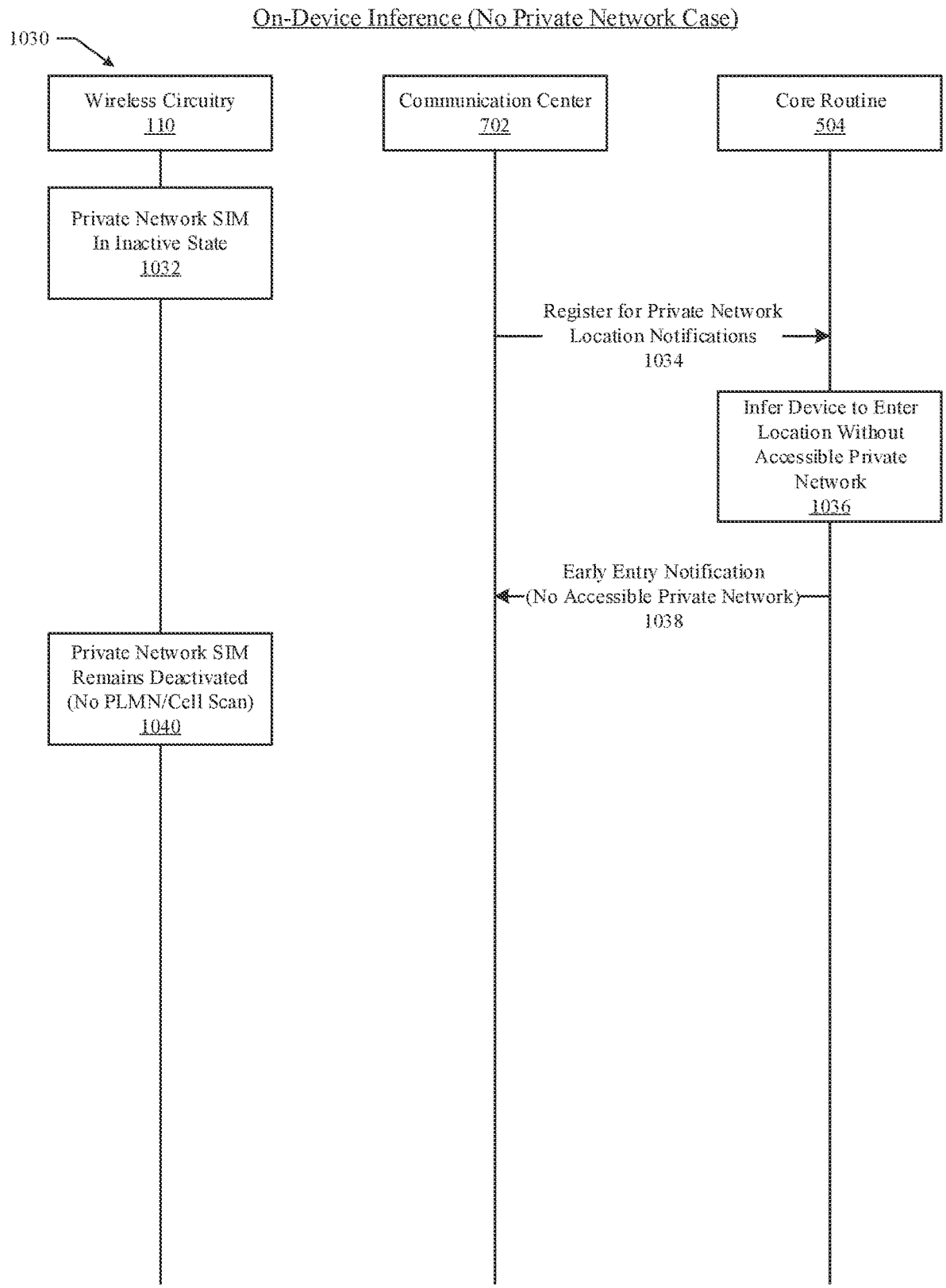

FIG. 10B illustrates a diagram 1030 of an on-device inference process used for personalized private cellular wireless network management by wireless device 102 when there is no accessible private cellular wireless network available for use by the wireless device 102 at a particular location. At 1032, a SIM/eSIM associated with a private cellular wireless network is in an inactive state in the wireless device 102. At 1034, a communication center module 702 of the wireless device 102 sends a message to a core routine module 504 of the wireless device 102 to register for location notifications, such as an early entry notification indicating a predicted entry to a location or an early exit notification indicating a predicted exit from a location. In some embodiments, the location notifications are limited to frequent locations identified by the core routine module 504. In some embodiments, the location notifications are limited to locations at which private cellular wireless networks are known to the wireless device 102. At 1036, the core routine module 504 infers that the wireless device 102 will enter a previously learned frequent location at which no accessible private cellular wireless networks are known. In some embodiments, the core routine module 504 uses information from a stored database compiled by the wireless device 102 and which characterizes cell regions of known private cellular wireless networks. In some embodiments, no cells of private cellular wireless networks accessible to the wireless device 102 have been found in previous scan searches at the location. In some embodiments, a disallowed private cellular wireless network previously rejected an attachment attempt performed by the wireless device 102 at the location. At 1038, the core routine module 504 sends to the communication center module 702 an early entry notification message indicating a predicted entry to a location at which no accessible cellular private network is available to the wireless device 102. The communication center module 702, as a result, does not provide an early entry notification message to the wireless circuitry 110 for entry to the location. At 1040, the SIM/eSIM associated with a private cellular wireless network remains deactivated and no PLMN/cell scan is triggered by the wireless circuitry 110.

Figure 10C:
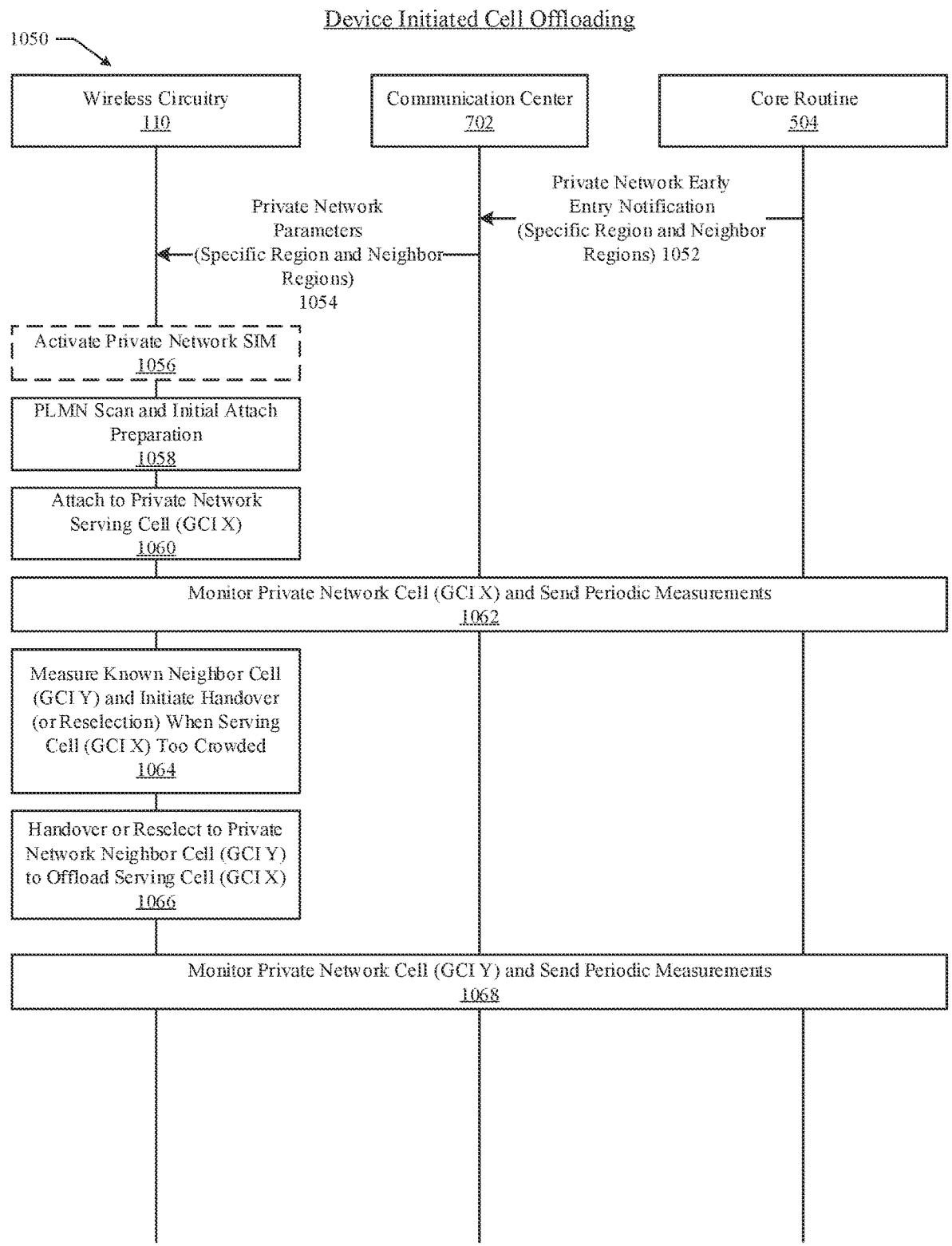
FIG. 10C illustrates a diagram of an example of device-initiated cell offloading for a private cellular wireless network, according to some embodiments.

FIG. 10C illustrates a diagram 1050 of an example of device-initiated cell offloading for a private cellular wireless network. At 1052, the core routine module 504 sends, to the communication center module 702, a private network early entry notification message that includes one or more private network parameters to use for searching for and/or attaching to a cell of one or more private cellular wireless networks. In some embodiments, the private network parameters included in the early entry notification include one or more radio frequencies to use for searching for cells of the one or more private cellular wireless networks. In some embodiments, the private network parameters include an identifier for a private cellular wireless network known at the frequent location predicted to be entered. In some embodiments, the private network parameters include information regarding a specific cell region previously located and associated neighbor cell regions of a private cellular wireless network. At 1054, the communication center module 702 forwards the private network parameters to the wireless circuitry 110 of the wireless device 102. In some embodiments, the private network parameters include specifications for one or more cell regions of a private cellular wireless network known at the frequent location to be entered. At 1056, the wireless circuitry 110 activates (if not already activated) a private network SIM (or eSIM 208) associated with a private cellular wireless network identified by the private network parameters received at 1054. At 1058, the wireless circuitry 110 performs a PLMN scan based on the private network parameters and prepares for initial attachment to a cell of the private cellular wireless network. At 1060, the wireless circuitry 110 attaches to a serving cell (indicated by a GCI value 'X') of the private cellular wireless network. At 1062, the wireless circuitry 110 monitors the serving cell and sends periodic measurements (or other status information) of the serving cell to the communication center module 702 and/or the core routine module 504. At 1064, responsive to detecting the serving cell 'X' is too crowded, e.g., a loading of the serving cell 'X' is higher than a loading threshold, or based on cell access success rate, wireless resource usage statistics, and/or measured interference levels for the serving cell 'X' provide an indication that the serving cell 'X' is highly loaded, and a neighbor cell is available, the wireless circuitry 110 measures one or more known neighbor cells available to the wireless device 102, e.g., a neighbor cell indicated by a GCI value 'Y'. In some embodiments, the network parameters obtained from the communication center module 702 at 1054 include indications of neighbor cells of the serving cell 'X'. In some embodiments, the network parameters obtained from the communication center module 702 at 1054 include information regarding coverage area of the serving cell 'X' and of neighbor cells of the serving cell 'X'. The wireless circuitry 110 can proactively measure neighbor cells and prepare for handover (or reselection) to offload from the serving cell to a neighbor cell. At 1066, the wireless circuitry 110 performs a device-initiated handover (or reselection) process to transfer from the serving cell with GCI value 'X' to the neighbor cell with GCI value 'Y'. At 1068, the wireless circuitry 110 monitors the new serving cell 'Y' and sends periodic measurements (or other status information) of the serving cell 'Y' to the communication center module 702 and/or the core routine module 504.

In some embodiments, a user of the wireless device 102 can trigger a search for attachment to a private cellular wireless network. A user-triggered search can occur at a frequent location or at a non-frequently visited location. The wireless device 102 can enable a SIM/eSIM based on a user-triggered search, and the wireless circuitry 110 of the wireless device 102 can use applicable private network parameters to locate and attach to a cell of a private cellular wireless network associated with the enabled SIM/eSIM. When one or more cells of the private cellular wireless network are located and attached to, the wireless device 102 can learn characteristics of the private cellular wireless network at the location of the user-triggered search and add cells found (and characteristics measured) to the on-device learned database 602. The wireless device 102 can also add information to the on-device learned database 602 when no cell is found or when a cell is found and rejects attachment by the wireless device 102. The wireless device 102 can maintain information about geographic coordinates and extent of the private cellular wireless network found at the user-triggered search location and enable/disable SIMs/eSIMs associated with the private cellular wireless network when entering or exiting the user-triggered search location, just as with frequent locations discussed herein. Early entry and early exit notifications can also be used when predicted to enter or exit the user-triggered search location.

Figure 11:
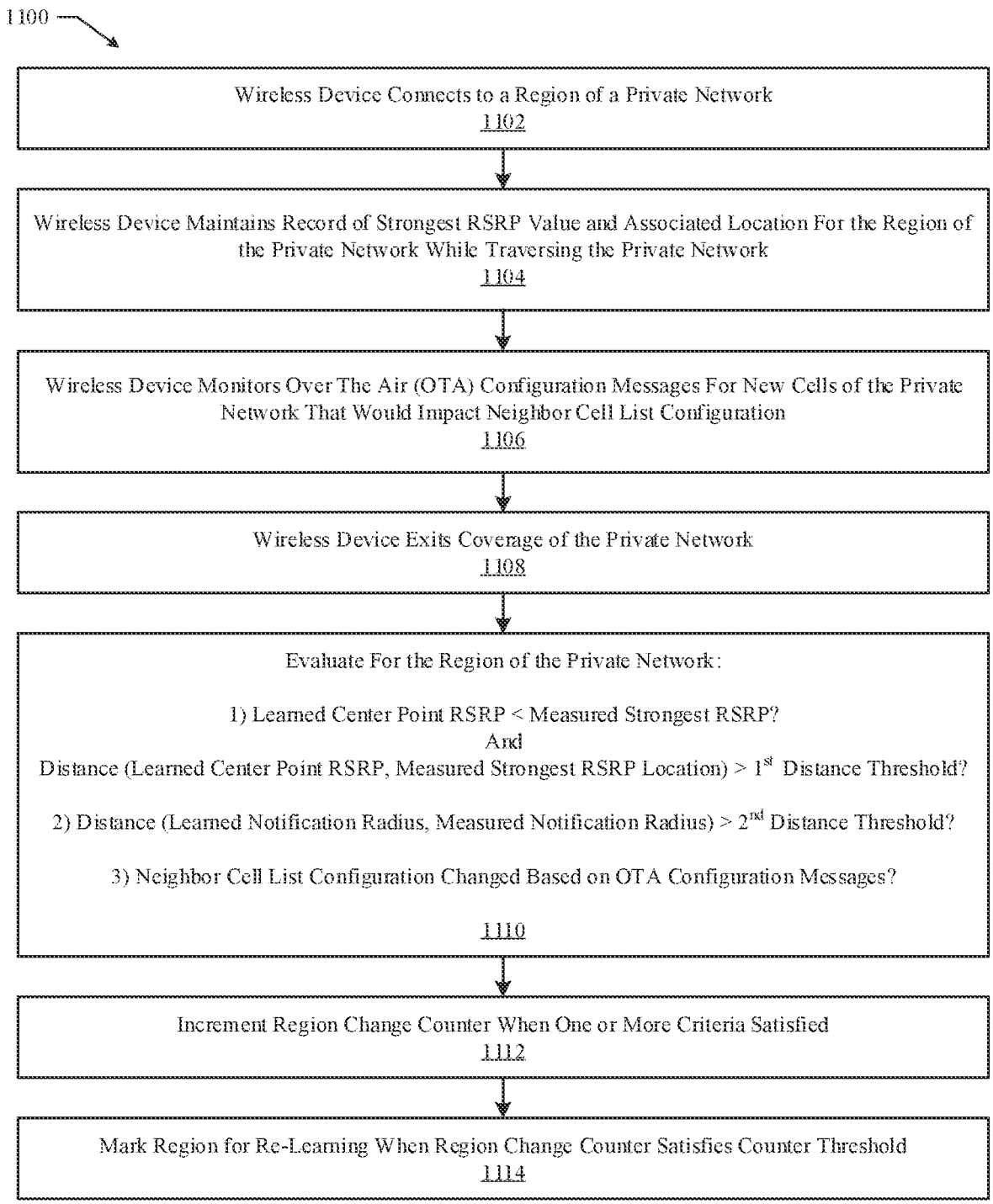
FIG. 11 illustrates a flowchart of an exemplary on-device re-learning process of a private cellular wireless network, according to some embodiments.

FIG. 11 illustrates a flowchart 1100 of an exemplary on-device re-learning process to re-characterize a private cellular wireless network by a wireless device 102. Private cellular wireless network topologies can change over time. The wireless device 102 can use measurements taken when visiting cells to determine i) whether an estimated center point having a strongest signal strength, e.g., a highest measured RSRP value, has changed and/or ii) whether a notification radius at which an out of service (OOS) condition occurs changes. One or more new cells can be added to a private cellular wireless network. A cell transmitter/receiver can change locations within a cell. One or more previously detected cells can be removed from the private cellular wireless network. If a private cellular wireless network provides messages regarding neighbor cell configuration measurements, a wireless device 102, when registered with a serving cell of the private cellular wireless network, can receive radio resource control (RRC) reconfiguration messages and/or system information broadcast (SIB) messages that indicate changes to cells of a private cellular wireless network, e.g., additions of cells to a neighbor cell list for the wireless device 102 to measure. The wireless device 102 can determine to re-trigger a learning process to re-characterize the private cellular wireless network when one or more criteria are met. At 1102, the wireless device 102 connects to a cell region of a private cellular wireless network. At 1104, the wireless device 102 maintains a record of a strongest signal strength, e.g., a strongest measured RSRP value, and associated location coordinates of the strongest signal strength for the cell region while traversing the private cellular wireless network. At 1106, the wireless device 102 monitors for over-the-air (OTA) configuration messages (e.g., RRC reconfiguration messages and/or SIB messages) that indicate new cells of the private cellular wireless network, such as cells added to or removed from a neighbor cell list. At 1108, the wireless device exits radio network coverage of the private cellular wireless network. At 1110, the wireless device 102 evaluates several criteria for a cell region of the private cellular wireless network. Example criteria include: i) whether a strongest signal strength (e.g., a strongest RSRP value) measured in the cell region exceeds a previously learned center point signal strength (e.g., a stored previously strongest measured RSRP value) and whether a distance between the measured strongest signal strength location and the previously learned center point location exceeds a first distance threshold; ii) whether a difference between a measured notification radius associated with an OOS condition and a previously learned notification radius exceeds a second distance threshold; and iii) detection of a neighbor cell list configuration change based on OTA configuration messages received from the private cellular wireless network. At 1112, the wireless device 102 increments a change counter associated with the cell region when one or more of the criteria at 1110 are satisfied. At 1114, the wireless device 102 marks the cell region of the private cellular wireless network as requiring a re-learning process to re-characterize the cell region of the private cellular wireless network when the change counter for the cell region satisfies a counter threshold, e.g., three or more visits to the cell region. In some embodiments, the wireless device 102 requires one or more criteria to be satisfied in three consecutive visits to the cell region in order to mark the cell region for re-learning.

Figure 12A:
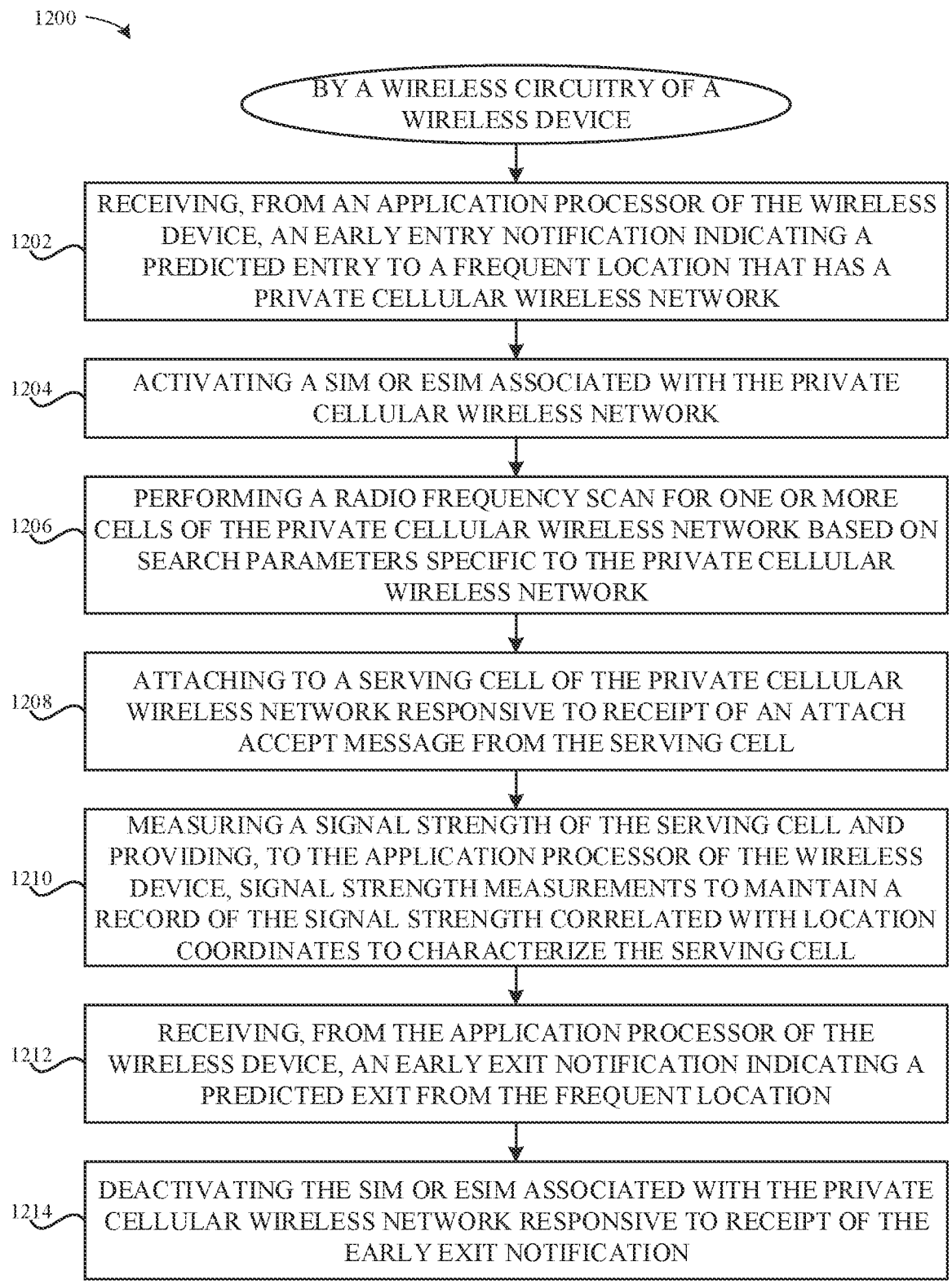
FIG. 12A illustrates a flowchart of an exemplary method for private cellular wireless network management on a wireless device, according to some embodiments.

FIG. 12A illustrates a flowchart 1200 of an exemplary method for private cellular wireless network management executed by wireless circuitry 110 of a wireless device 102. At 1202, the wireless circuitry 110 receives, from an application processor of the wireless device 102, an early entry notification message predicting entry to a frequent location that has a private cellular wireless network. The notification message can be received prior to entry to the frequent location. At 1204, the wireless circuitry 110 activates a SIM or eSIM 208 associated with the private cellular wireless network. At 1206, the wireless circuitry 110 performs a radio frequency scan for one or more cells of the private cellular wireless network based on search parameters specific to the private cellular wireless network. At 1208, the wireless circuitry 110 attaches to a serving cell of the private cellular wireless network responsive to receipt of an attach accept message from the serving cell. At 1210, the wireless circuitry 110 measures a signal strength of the serving cell and provides, to the application processor of the wireless device 102, signal strength measurements to maintain a record of the signal strength correlated with location coordinates to characterize the serving cell. At 1212, the wireless circuitry 110 receives, from the application processor, an early exit notification message predicating an exit from the frequent location. At 1214, the wireless circuitry 110 deactivates the SIM or eSIM 208 associated with the private cellular wireless network responsive to receipt of the early exit notification.

In some embodiments, the wireless circuitry 110 provides to the application processor an indication that no cell of the private cellular wireless network was found when unable to locate any cells of the private cellular wireless network during the radio frequency scan, and the application processor updates a tag for the frequent location indicating an inactive private cellular wireless network or the absence of a private cellular wireless network at the frequent location. In some embodiments, the wireless circuitry 110 provides to the application processor an indication of an attach reject message received from the private cellular wireless network in response to an attachment attempt by the wireless circuitry 110, and the application processor updates a tag for the frequent location indicating a disallowed private cellular wireless network at the frequent location. In some embodiments, the wireless circuitry 110 measures a neighbor cell of the private cellular wireless network when i) the signal strength of the serving cell satisfies a handover (or reselection) measurement threshold criterion, and ii) no early exit notification has been received from the applications processor while the wireless device is attached to the serving cell, and subsequently performs a device initiated-handover (or reselection) from the serving cell to the neighbor cell when the neighbor cell satisfies a handover (or reselection) threshold criterion. In some embodiments, the wireless circuitry 110 provides, to the application processor, serving cell and neighbor cell measurements while attached to the serving cell, and the application processor determines, based on the serving cell measurements and associated location coordinates, i) a center point location coordinate of the serving cell associated with a highest measured signal strength for the serving cell, and ii) a notification radius for the serving cell indicating a distance from the center point of the serving cell to a location at which the wireless device 102 detects an out of service (OOS) condition. In some embodiments, the wireless circuitry 110 provides, to the application processor after handover (or reselection), a most recent signal strength of the serving cell measured before handover (or reselection) to the neighbor cell, where the handover (or reselection)

measurement threshold criterion is based on one or more previously measured most recent signal strength measurements of the serving cell before handover (or reselection) to neighbor cells. In some embodiments, the wireless circuitry 110 provides, to the application processor, global cell indicator (GCI) values for one or more cells of the private cellular wireless network while traversing the private cellular wireless network, where the applications processor updates a database characterizing the private cellular wireless network based on the GCI values and associated location coordinates. In some embodiments, the search parameters include one or more radio frequency values for cells of the private cellular wireless network provided by the application processor with the early entry notification message. In some embodiments, the wireless circuitry 110 monitors the serving cell of the private network cellular wireless network and performs a device-initiated handover (or reselection) to a neighbor cell when available and the measured access success rate, wireless resource usage statistics, and/or measured interference levels indicate loading of the serving cell satisfies a loading handover (or reselection) threshold criterion.

Figure 12B:
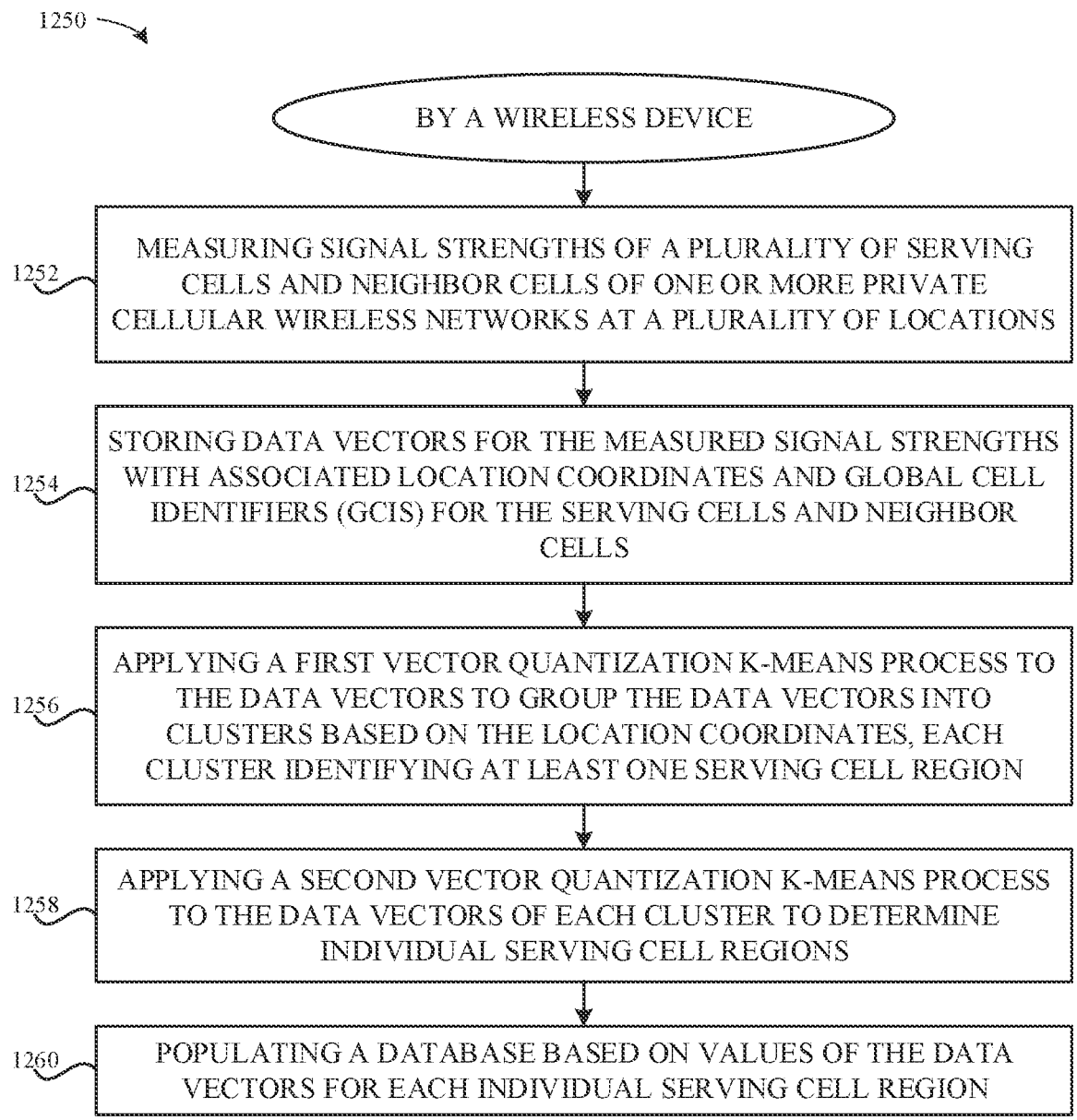
FIG. 12B illustrates a flowchart of an exemplary method for building a database of one or more private cellular wireless networks by a wireless device, according to some embodiments.

FIG. 12B illustrates a flowchart 1250 of an exemplary method for building a database of one or more private cellular wireless networks by a wireless device 102. At 1252, the wireless device 102 measures signal strengths of multiple serving cells and neighbor cells of one or more private cellular wireless networks at multiple locations. At 1254, the wireless device 102 stores data vectors for the measured signal strengths with associated location coordinates and global cell identifier (GCIs) for the serving cells and neighbor cells. At 1256, the wireless device 102 applies a first vector quantization k-means process to the data vectors to group the data vectors into clusters based on the location coordinates, each cluster identifying at least one serving cell region. At 1258, the wireless device 102 applies a second vector quantization k-means process to the data vectors of each cluster to determine individual serving cell regions. At 1260, the wireless device 102 populates the database based on values of the data vectors for each individual serving cell region.

In some embodiments, each serving cell region is characterized by: i) a GCI value for the serving cell region, ii) a center point location coordinate associated with a highest measured signal strength for the serving cell region, and iii) a GCI value for a neighbor cell or an indication of no neighbor cell. In some embodiments, each serving cell region is further characterized by a last signal strength measured prior to handover (or reselection) between the serving cell and the neighbor cell, when the serving cell region includes a GCI value for the neighbor cell. In some embodiments, each serving cell region is further characterized by a notification radius indicating a distance from the center point of the serving cell region to a location at which the wireless device detects an out of service (OOS) condition. In some embodiments, the wireless device 102 re-measures signal strengths, re-applies vector quantization processes based on the re-measured signal strengths, and updates an entry in the database for a serving cell region when a re-learning criterion is satisfied. In some embodiments, the re-learning criterion is satisfied when repeated measurements of the serving cell region indicate a change in one or more of: i) a center point location coordinate associated with a highest measured signal strength for the serving cell region, or ii) a notification radius indicating a distance from the center point of the serving cell region to a location at which the wireless device detects an out of service (OOS) condition. In some embodiments, the re-learning criterion is satisfied when the wireless device 102 receives one or more over-the-air (OTA) configuration messages indicating changes to a neighbor cell list of the serving cell region.

In some embodiments, a user of the wireless device 102 can trigger searches for private cellular wireless networks at a location, which may be a non-frequently visited location. Information regarding private cellular wireless networks found at a user-triggered location can be added to the on-device learned database. The wireless device 102 can trigger early entry notification messages and early exit notification messages for the non-frequently visited location that has a private cellular wireless network to which the wireless device 102 can attach.

Figure 13:
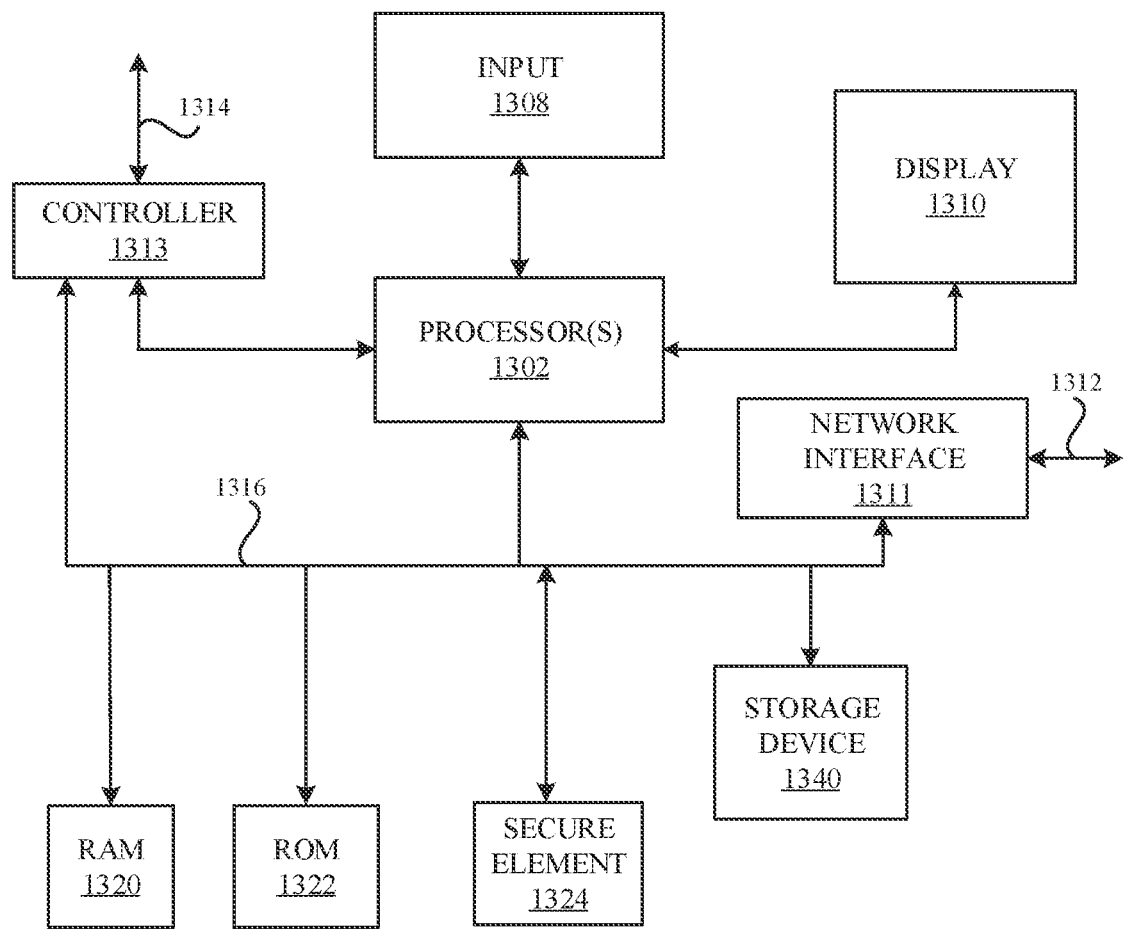
FIG. 13 illustrates a block diagram of exemplary elements of a wireless device, according to some embodiments.

FIG. 13 illustrates a detailed view of a representative computing device 1300 that can be used to implement various methods described herein, according to some embodiments. In particular, the detailed view illustrates various components that can be included in the mobile wireless device 102. As shown in FIG. 13, the computing device 1300 can include a processor 1302 that represents a microprocessor or controller for controlling the overall operation of computing device 1300. The computing device 1300 can also include a user input device 1308 that allows a user of the computing device 1300 to interact with the computing device 1300. For example, the user input device 1308 can take a variety of forms, such as a button, keypad, dial, touch screen, audio input interface, visual/image capture input interface, input in the form of sensor data, etc. Still further, the computing device 1300 can include a display 1310 that can be controlled by the processor 1302 to display information to the user. A data bus 1316 can facilitate data transfer between at least a storage device 1340, the processor 1302, and a controller 1313. The controller 1313 can be used to interface with and control different equipment through an equipment control bus 1314. The computing device 1300 can also include a network/bus interface 1311 that communicatively couples to a data link 1312. In the case of a wireless connection, the network/bus interface 1311 can include a wireless transceiver.

The computing device 1300 also includes a storage device 1340, which can comprise a single disk or a plurality of disks (e.g., hard drives), and includes a storage management module that manages one or more partitions within the storage device 1340. In some embodiments, storage device 1340 can include flash memory, semiconductor (solid state) memory or the like. The computing device 1300 can also include a Random Access Memory (RAM) 1320 and a Read-Only Memory (ROM) 1322. The ROM 1322 can store programs, utilities or processes to be executed in a non-volatile manner. The RAM 1320 can provide volatile data storage, and stores instructions related to the operation of the computing device 1300. The computing device 1300 further includes a secure element 1324, which can include an eUICC 108 on which to store one or more eSIMs 208 and/or a UICC 118 (physical SIM card).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when 5G NR, LTE, and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for private cellular wireless network management on a wireless device, the method comprising:
by wireless circuitry of the wireless device:
receiving, from an application processor of the wireless device, an early entry notification indicating a frequent location with a private cellular wireless network prior to entry to the frequent location;
activating a subscriber identity module (SIM) or electronic SIM (eSIM) associated with the private cellular wireless network;
performing a radio frequency scan for one or more cells of the private cellular wireless network based on search parameters specific to the private cellular wireless network;
attaching to a serving cell of the private cellular wireless network responsive to receipt of an attach accept message from the serving cell;
measuring a signal strength of the serving cell and providing, to the application processor of the wireless device, signal strength measurements to maintain a record of the signal strength correlated with location coordinates to characterize the serving cell;
receiving, from the application processor of the wireless device, an early exit notification indicating imminent exit from the frequent location; and
deactivating the SIM or eSIM associated with the private cellular wireless network responsive to receipt of the early exit notification.

2. The method of claim 1 further comprising:
by the wireless circuitry of the wireless device:
providing, to the application processor of the wireless device, an indication that no cell of the private cellular wireless network was found when unable to locate any cells of the private cellular wireless network during the radio frequency scan,
wherein the application processor updates a tag for the frequent location indicating no or an inactive private cellular wireless network at the frequent location.

3. The method of claim 1, further comprising:
by the wireless circuitry of the wireless device:
providing, to the application processor of the wireless device, an indication of an attach reject message received from the private cellular wireless network responsive to an attachment attempt,
wherein the application processor updates a tag for the frequent location indicating a disallowed private cellular wireless network at the frequent location.

4. The method of claim 1, further comprising:
by the wireless circuitry of the wireless device:
measuring a neighbor cell of the private cellular wireless network when i) the signal strength of the serving cell satisfies a handover or reselection measurement threshold criterion, and ii) no early exit notification has been received from the application processor while the wireless device is attached to the serving cell; and
performing a device-initiated handover or reselection from the serving cell to the neighbor cell when the neighbor cell satisfies a handover or reselection threshold criterion.

5. The method of claim 4, further comprising:
by the wireless circuitry of the wireless device:
providing, to the application processor of the wireless device, serving cell and neighbor cell measurements while attached to the serving cell,
wherein the application processor determines based on the serving cell measurements and associated location coordinates:
a center point location coordinate of the serving cell associated with a highest measured signal strength for the serving cell, and
a notification radius for the serving cell indicating a distance from the center point of the serving cell to a location at which the wireless device detects an out of service (OOS) condition.

6. The method of claim 4, further comprising:
by the wireless circuitry of the wireless device:
providing, to the application processor of the wireless device after handover or reselection, a most recent signal strength of the serving cell measured before handover or reselection to the neighbor cell,
wherein the handover or reselection measurement threshold criterion is based on one or more previously measured most recent signal strength measurements of the serving cell before handover or reselection to neighbor cells.

7. The method of claim 1, further comprising:
by the wireless circuitry of the wireless device:
providing, to the application processor of the wireless device, global cell indicator (GCI) values for one or more cells of the private cellular wireless network while traversing the private cellular wireless network,
wherein the application processor updates a database characterizing the private cellular wireless network based on the GCI values and associated location coordinates.

8. The method of claim 1, wherein the search parameters comprise one or more radio frequency values for cells of the private cellular wireless network provided by the application processor with the early entry notification.

9. The method of claim 1, further comprising:
by the wireless circuitry of the wireless device:
monitoring wireless resource usage statistics for the serving cell of the private cellular wireless network; and
performing a device-initiated handover or reselection to a neighbor cell when available and the monitored wireless resource usage statistics indicate loading of the serving cell satisfies a loading handover or reselection threshold criterion.

10. A method for building a database of private cellular wireless networks by a wireless device, the method comprising:

measuring signal strengths of a plurality of serving cells and neighbor cells of one or more private cellular wireless networks at a plurality of locations;
storing data vectors for the measured signal strengths with associated location coordinates and global cell identifier (GCIs) for the serving cells and neighbor cells;
applying a first vector quantization k-means process to the data vectors to group the data vectors into clusters based on the location coordinates, each cluster identifying at least one serving cell region;
applying a second vector quantization k-means process to the data vectors of each cluster to determine individual serving cell regions; and
populating the database based on values of the data vectors for each individual serving cell region.

11. The method of claim 10, wherein each serving cell region is characterized by:
a GCI value for the serving cell region;
a center point location coordinate associated with a highest measured signal strength for the serving cell region; and
a GCI value for a neighbor cell or an indication of no neighbor cell.

12. The method of claim 11, wherein each serving cell region is further characterized by:
a last signal strength measured prior to handover or reselection between the serving cell and the neighbor cell, when the serving cell region includes a GCI value for the neighbor cell.

13. The method of claim 11, wherein each serving cell region is further characterized by:
a notification radius indicating a distance from the center point of the serving cell region to a location at which the wireless device detects an out of service (OOS) condition.

14. The method of claim 10, further comprising:
re-measuring signal strengths, re-applying vector quantization processes based on the re-measured signal strengths, and updating an entry in the database for a serving cell region when a re-learning criterion is satisfied.

15. The method of claim 14, wherein the re-learning criterion is satisfied when repeated measurements of the serving cell region indicate a change in one or more of:
a center point location coordinate associated with a highest measured signal strength for the serving cell region, or
a notification radius indicating a distance from the center point of the serving cell region to a location at which the wireless device detects an out of service (OOS) condition.

16. The method of claim 14, wherein the re-learning criterion is satisfied when receiving one or more over-the-air (OTA) configuration messages indicating changes to a neighbor cell list of the serving cell region.

17. A wireless device comprising:
wireless circuitry including one or more antennas; and
processing circuitry communicatively coupled to the wireless circuitry, the processing circuitry comprising an application processor (AP) and at least one storage element storing instructions that when executed by the processing circuitry configure the wireless device to:
determine an early entry notification indicating a frequent location with a private cellular wireless network prior to entry to the frequent location;

activate a subscriber identity module (SIM) or electronic SIM (eSIM) associated with the private cellular wireless network;
perform a radio frequency scan for one or more cells of the private cellular wireless network based on search parameters specific to the private cellular wireless network;
attach to a serving cell of the private cellular wireless network responsive to receipt of an attach accept message from the serving cell;
measure a signal strength of the serving cell and maintain a record of signal strength measurements correlated with location coordinates to characterize the serving cell;
determine an early exit notification indicating imminent exit from the frequent location; and
deactivate the SIM or eSIM associated with the private cellular wireless network, responsive to receipt of the early exit notification.

18. The wireless device of claim 17, wherein execution of the instructions further configures the wireless device to:
update a tag for the frequent location, responsive to receipt of an attach reject message from the serving cell, to indicate a disallowed private cellular wireless network at the frequent location.

19. The wireless device of claim 17, wherein execution of the instructions further configures the wireless device to:
determine based on serving cell measurements obtained with attached to the serving cell:
a center point location coordinate of the serving cell associated with a highest measured signal strength for the serving cell, and
a notification radius for the serving cell indicating a distance from the center point of the serving cell to a location at which the wireless device detects an out of service (OOS) condition.

20. The wireless device of claim 17, wherein execution of the instructions further configures the wireless device to:
accumulate data vectors of signal strength measurements, location coordinates, and global cell identifier (GCI) values while attached to different cells of the private cellular wireless networks;
apply one or more vector quantization k-means processes to the data vectors to determine individual serving cell regions of the private cellular wireless networks; and
populate a database characterizing individual serving cell regions based on values of the data vectors.

* * * * *